(12) United States Patent
Yamamoto

(10) Patent No.: US 7,426,874 B2
(45) Date of Patent: *Sep. 23, 2008

(54) ELECTROMAGNETIC FLOWMETER WITH MEASURING TUBE

(75) Inventor: Tomoshige Yamamoto, Tokyo (JP)

(73) Assignee: Yamatake Corporation, Tokyo (JP)

( * ) Notice: Subject to any disclaimer, the term of this patent is extended or adjusted under 35 U.S.C. 154(b) by 98 days.

This patent is subject to a terminal disclaimer.

(21) Appl. No.: 11/578,209

(22) PCT Filed: Apr. 8, 2005

(86) PCT No.: PCT/JP2005/006935

§ 371 (c)(1),
(2), (4) Date: Oct. 6, 2006

(87) PCT Pub. No.: WO2005/098372

PCT Pub. Date: Oct. 20, 2005

(65) Prior Publication Data

US 2007/0220993 A1  Sep. 27, 2007

(30) Foreign Application Priority Data

Apr. 9, 2004 (JP) ............................ 2004-116251

(51) Int. Cl.
 *G01F 1/58* (2006.01)

(52) U.S. Cl. ...................................... 73/861.12; 702/45

(58) Field of Classification Search ............... 73/861.12
See application file for complete search history.

(56) References Cited

U.S. PATENT DOCUMENTS

| 2007/0088511 | A1* | 4/2007 | Yamamoto | 702/45 |
| 2007/0234820 | A1* | 10/2007 | Yamamoto | 73/861.12 |
| 2007/0272030 | A1* | 11/2007 | Yamamoto | 73/861.12 |
| 2008/0028867 | A1* | 2/2008 | Yamamoto | 73/861.12 |

FOREIGN PATENT DOCUMENTS

| JP | 2004-108973 A | 4/2004 |
| JP | 2004-108975 A | 4/2004 |
| WO | WO 03/027614 A | 4/2003 |

* cited by examiner

*Primary Examiner*—Harshad Patel
(74) *Attorney, Agent, or Firm*—Blakely, Sokoloff, Taylor & Zafman

(57) ABSTRACT

An electromagnetic flowmeter includes a measuring tube through which a fluid to be measured flows, electrodes which detect an electromotive force generated by a magnetic field applied to the fluid. An exciting coil applies, to the fluid, a time-changing magnetic field asymmetrical to a plane (PLN) which includes the electrodes and is perpendicular to the axial direction of the measuring tube. A signal conversion unit extracts a $\partial A/\partial t$ component from the resultant electromotive force of the electromotive force. A flow rate output unit removes a variation factor for a span as a coefficient applied to the magnitude of the flow velocity on the basis of the $\partial A/\partial t$ component, and calculates the flow rate of the fluid from the result obtained by removing the variation factor.

7 Claims, 16 Drawing Sheets

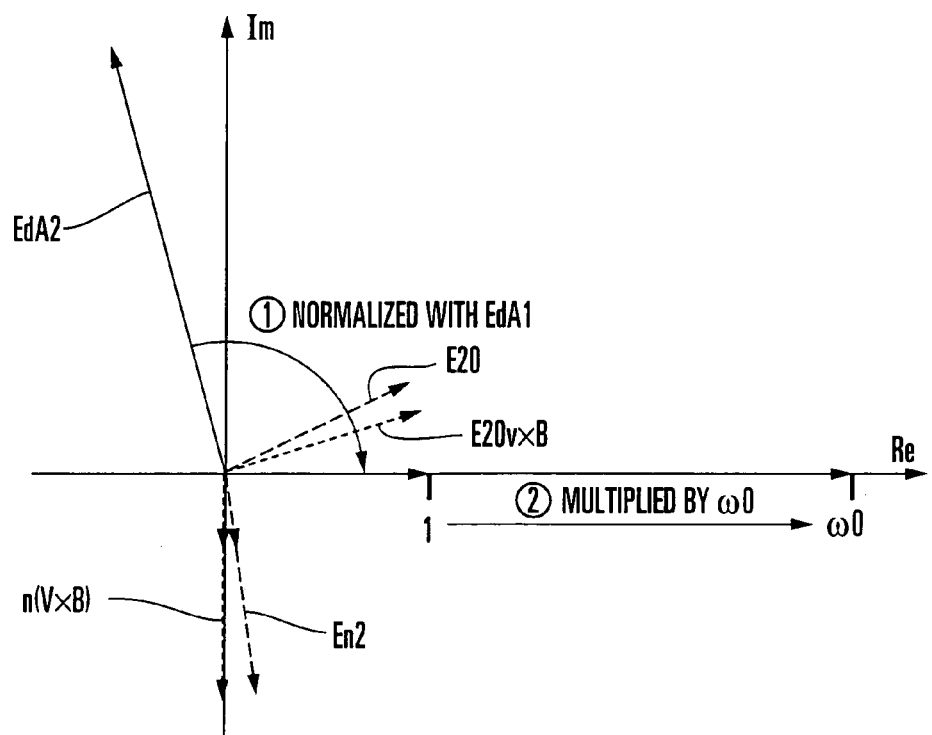
F I G. 10
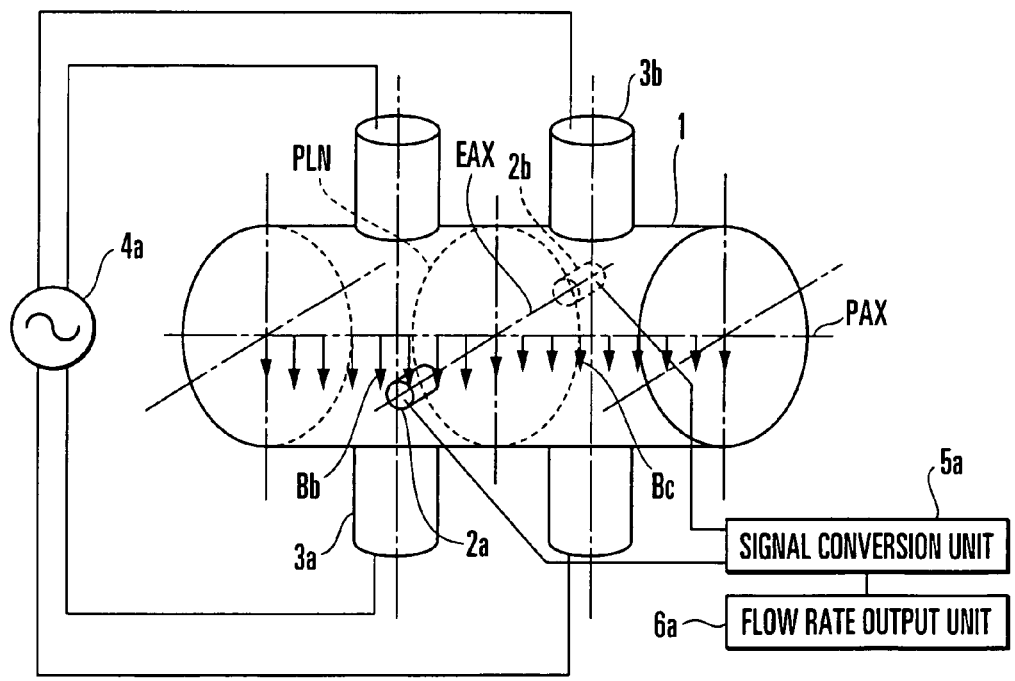
F I G. 11

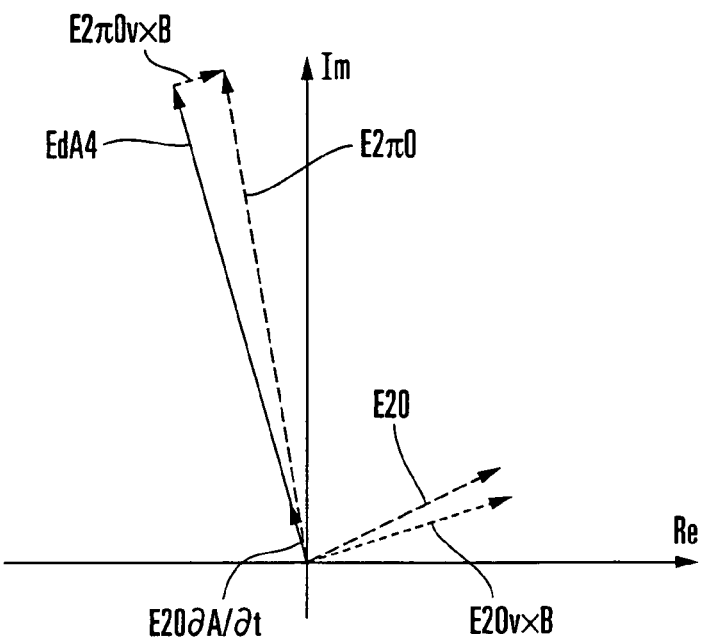
F I G. 20
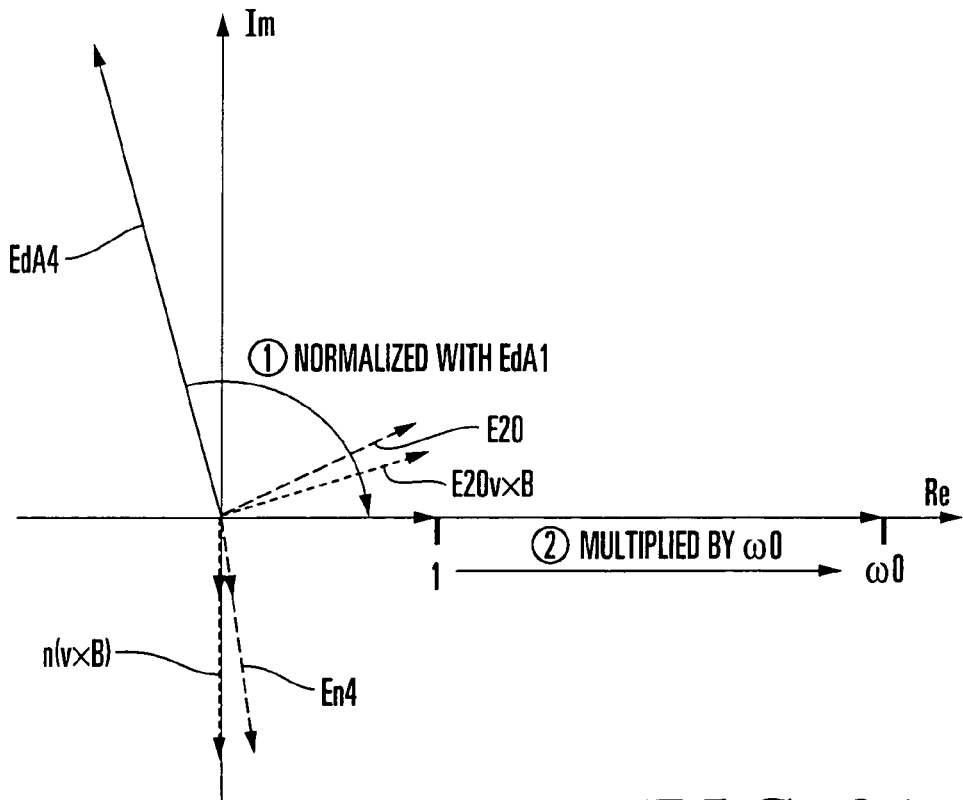
F I G. 21

ELECTROMAGNETIC FLOWMETER WITH MEASURING TUBE

This is a non-provisional application claiming the benefit of International application number PCT/JP2005/006935, filed Apr. 8, 2005.

TECHNICAL FIELD

The present invention relates to an electromagnetic flowmeter and, more particularly, to a span correction technique of automatically correcting a coefficient to be applied to the flow velocity of a component originating from the flow rate of a fluid to be measured of the inter-electrode electromotive force detected by electrodes.

BACKGROUND ART

A logical propositional portion common to a prior art and the present invention and necessary to understand both of them will be described. Generally known mathematical basic knowledge will be described first.

A cosine wave $P \cdot \cos(\omega \cdot t)$ and a sine wave $Q \cdot \sin(\omega \cdot t)$ which have the same frequency but different amplitudes are combined into the following cosine wave. Let P and Q be amplitudes, and $\omega$ be an angular frequency.

$$P \cdot \cos(\omega \cdot t) + Q \cdot \sin(\omega \cdot t) = (P^2+Q^2)^{1/2} \cdot \cos(\omega \cdot t - \epsilon) \text{ for } \epsilon = \tan^{-1}(Q/P) \quad (1)$$

In order to analyze the combining operation in equation (1), it is convenient to perform mapping on a complex coordinate plane so as to plot an amplitude P of cosine wave $P \cdot \cos(\omega \cdot t)$ along a real axis and an amplitude Q of the sine wave $Q \cdot \sin(\omega \cdot t)$ along an imaginary axis. That is, on the complex coordinate plane, a distance $(P^2+Q^2)^{1/2}$ from the origin gives the amplitude of the combined wave, and an angle $e = \tan^{-1}(Q/P)$ gives the phase difference between the combined wave and $\omega \cdot t$.

In addition, on the complex coordinate plane, the following relational expression holds.

$$L \cdot \exp(j \cdot \epsilon) = L \cdot \cos(\epsilon) + j \cdot L \cdot \sin(\epsilon) \quad (2)$$

Equation (2) is an expression associated with a complex vector, in which j is an imaginary unit, L gives the length of the complex vector, and e gives the direction of the complex vector. In order to analyze the geometrical relationship on the complex coordinate plane, it is convenient to use conversion to a complex vector.

The following description uses mapping onto a complex coordinate plane like that described above and geometrical analysis using complex vectors to show how an inter-electrode electromotive force behaves and explain how the prior art uses this behavior.

A complex vector arrangement with one coil set and an electrode pair in the electromagnetic flowmeter proposed by the present inventor (see patent reference WO 03/027614) will be described next.

FIG. 25 is a block diagram for explaining the principle of the electromagnetic flowmeter in the above patent reference. This electromagnetic flowmeter includes a measuring tube 1 through which a fluid to be measured flows, a pair of electrodes 2a and 2b which are placed to face each other in the measuring tube 1 so as to be perpendicular to both a magnetic field to be applied to the fluid and an axis PAX of the measuring tube 1 and come into contact with the fluid, and detect the electromotive force generated by the magnetic flow and the flow of the fluid, and an exciting coil 3 which applies, to the fluid, a time-changing magnetic field asymmetric on the front and rear sides of the measuring tube 1 which are bordered on a plane PLN which includes the electrodes 2a and 2b, with the plane PLN serving as a boundary of the measuring tube 1.

Of a magnetic field Ba generated by the exciting coil 3, a magnetic field component (magnetic flux density) B1 orthogonal to both an electrode axis EAX connecting the electrodes 2a and 2b and the measuring tube axis PAX on the electrode axis EAX is given by $$B1 = b1 \cdot \cos(\omega 0 \cdot t - \theta 1) \quad (3)$$

In equation (3), b1 is the amplitude of the magnetic flux density B1, $\omega 0$ is an angular frequency, and $\theta 1$ is a phase difference (phase lag) from $\omega 0 \cdot t$. The magnetic flux density B1 will be referred to as the magnetic field B1 hereinafter.

An inter-electrode electromotive force which originates from a change in magnetic field and is irrelevant to the flow velocity of a fluid to be measured will be described first. Since the electromotive force originating from the change in magnetic field depends on a time derivative dB/dt of the magnetic field, and hence the magnetic field B1 generated by the exciting coil 3 is differentiated according to $$dB1/dt = -\omega 0 \cdot b1 \cdot \sin(\omega 0 \cdot t - \theta 1) \quad (4)$$

If the flow velocity of the fluid to be measured is 0, a generated eddy current is only a component originating from a change in magnetic field. An eddy current I due to a change in the magnetic field Ba is directed as shown in FIG. 26. Therefore, an inter-electrode electromotive force E which is generated by a change in the magnetic field Ba and is irrelevant to the flow velocity is directed as shown in FIG. 26 within a plane including the electrode axis EAX and the measuring tube axis PAX. This direction is defined as the negative direction.

At this time, the inter-electrode electromotive force E is the value obtained by multiplying a time derivative $-dB1/dt$ of a magnetic field whose direction is taken into consideration by a coefficient k (a complex number associated with the conductivity and permittivity of the fluidity to be measured and the structure of the measuring tube 1 including the layout of the electrodes 2a and 2b), as indicated by the following equation:

$$E = k \cdot \omega 0 \cdot b1 \cdot \sin(\omega 0 \cdot t - \theta 1) \quad (5)$$

Equation (5) is rewritten into the following equation:

$$\begin{aligned} E &= k \cdot \omega 0 \cdot b1 \cdot \{\sin(-\theta 1)\} \cdot \cos(\omega 0 \cdot t) + \\ &\quad k \cdot \omega 0 \cdot b1 \cdot \{\cos(-\theta 1)\} \cdot \sin(\omega 0 \cdot t) \\ &= k \cdot \omega 0 \cdot b1 \cdot \{-\sin(\theta 1)\} \cdot \cos(\omega 0 \cdot t) + \\ &\quad k \cdot \omega 0 \cdot b1 \cdot \{\cos(\theta 1)\} \cdot \sin(\omega 0 \cdot t) \end{aligned} \quad (6)$$

In this case, if equation (6) is mapped on the complex coordinate plane with reference to $\omega 0 \cdot t$, a real axis component Ex and an imaginary axis component Ey are given by $$\begin{aligned} Ex &= k \cdot \omega 0 \cdot b1 \cdot \{-\sin(\theta 1)\} \\ &= k \cdot \omega 0 \cdot b1 \cdot \{\cos(\tfrac{\pi}{2} + \theta 1)\} \end{aligned} \quad (7)$$

$$\begin{aligned} Ey &= k \cdot \omega 0 \cdot b1 \cdot \{\cos(\theta 1)\} \\ &= k \cdot \omega 0 \cdot b1 \cdot \{\sin(\tfrac{\pi}{2} + \theta 1)\} \end{aligned} \quad (8)$$

In addition, Ex and Ey represented by equations (7) and (8) are transformed into a complex vector Ec represented by $$Ec = Ex + j \cdot Ey = k \cdot \omega 0 \cdot b1 \cdot \left\{\cos\left(\frac{\pi}{2} + \theta 1\right)\right\} + \qquad (9)$$
$$j \cdot k \cdot \omega 0 \cdot b1 \cdot \left\{\sin\left(\frac{\pi}{2} + \theta 1\right)\right\}$$
$$= k \cdot \omega 0 \cdot b1 \cdot \left\{\cos\left(\frac{\pi}{2} + \theta 1\right) + j \cdot \sin\left(\frac{\pi}{2} + \theta 1\right)\right\}$$
$$= k \cdot \omega 0 \cdot b1 \cdot \exp\left\{j \cdot \left(\frac{\pi}{2} + \theta 1\right)\right\}$$

In addition, the coefficient k described above is transformed into a complex vector to obtain the following equation:

$$k = rk \cdot \cos(\theta 00) + j \cdot rk \cdot \sin(\theta 00) \qquad (10)$$
$$= rk \cdot \exp(j \cdot \theta 00)$$

In equation (10), rk is a proportional coefficient, and $\theta 00$ is the angle of the vector k with respect to the real axis.

Substituting equation (10) into equation (9) yields an inter-electrode electromotive force Ec (an inter-electrode electromotive force which originates from only a temporal change in magnetic field and is irrelevant to the flow velocity) transformed into complex coordinates as follows:

$$Ec = rk \cdot \exp(j \cdot \theta 00) \cdot \omega 0 \cdot b1 \cdot \exp\left\{j \cdot \left(\frac{\pi}{2} + \theta 1\right)\right\} \qquad (11)$$
$$= rk \cdot \omega 0 \cdot b1 \cdot \exp\left\{j \cdot \left(\frac{\pi}{2} + \theta 1 + \theta 00\right)\right\}$$

In equation (11), $rk \cdot \omega 0 \cdot b1 \cdot \exp\{j \cdot (p/2+\theta 1+\theta 00)\}$ is a complex vector having a length $rk \cdot \omega 0 \cdot b1$ and an angle $p/2+\theta 1+\theta 00$ with respect to the real axis.

An inter-electrode electromotive force originating from the flow velocity of a fluid to be measured will be described next. Letting V (V≠0) be the magnitude of the flow velocity of the fluid, since a component v×Ba originating from a flow velocity vector v of the fluid is generated in a generated eddy current in addition to the eddy current I when the flow velocity is 0, an eddy current Iv generated by the flow velocity vector v and the magnetic field Ba is directed as shown in FIG. 27. Therefore, the direction of an inter-electrode electromotive force Ev generated by the flow velocity vector v and the magnetic field Ba becomes opposite to the direction of the inter-electrode electromotive force E generated by the temporal change, and the direction of Ev is defined as the positive direction.

In this case, as indicated by the following equation, the inter-electrode electromotive force Ev originating from the flow velocity is the value obtained by multiplying the magnetic field B1 as indicated by the following equation by a coefficient kv (a complex number associated with a magnitude V of the flow velocity, the conductivity and permittivity of the fluidity to be measured, and the structure of the measuring tube 1 including the arrangement of the electrodes 2a and 2b):

$$Ev = kv \cdot \{b1 \cdot \cos(\omega 0 \cdot t \cdot \theta 1)\} \qquad (12)$$

Equation (12) is rewritten into $$Ev = kv \cdot b1 \cdot \cos(\omega 0 \cdot t) \cdot \cos(-\theta 1) - kv \cdot b1 \cdot \sin(\omega 0 \cdot t) \cdot \qquad (13)$$
$$\sin(-\theta 1)$$
$$= kv \cdot b1 \cdot \{\cos(\theta 1)\} \cdot \cos(\omega 0 \cdot t) + kv \cdot b1 \cdot \{\sin(\theta 1)\} \cdot$$
$$\sin(\omega 0 \cdot t)$$

In this case, when mapping equation (13) on the complex coordinate plane with reference to $\omega 0 \cdot t$, a real axis component Evx and an imaginary axis component Evy are given by $$Evx = kv \cdot b1 \cdot \{\cos(\theta 1)\} \qquad (14)$$
$$Evy = kv \cdot b1 \cdot \{\sin(\theta 1)\} \qquad (15)$$

In addition, Evx and Evy represented by equations (14) and (15) are transformed into a complex vector Evc represented by $$Evc = Evx + j \cdot Evy \qquad (16)$$
$$= kv \cdot b1 \cdot \{\cos(\theta 1)\} + j \cdot kv \cdot b1 \cdot \{\sin(\theta 1)\}$$
$$= k \cdot b1 \cdot \{\cos(\theta 1) + j \cdot \sin(\theta 1)\}$$
$$= k \cdot b1 \cdot \exp\{j \cdot (\theta 1)\}$$

In addition, the coefficient kv described above is transformed into a complex vector to obtain the following equation:

$$kv = rkv \cdot \cos(\theta 01) + j \cdot rkv \cdot \sin(\theta 01) \qquad (17)$$
$$= rkv \cdot \exp(j \cdot \theta 01)$$

In equation (17), rkv is a proportional coefficient, and $\theta 01$ is the angle of the vector kv with respect to the real axis. In this case, rkv is equivalent to the value obtained by multiplying the proportional coefficient rk (see equation (10)) described above by the magnitude V of the flow velocity and a proportion coefficient γ. That is, the following equation holds:

$$rkv = \gamma \cdot rk \cdot V \qquad (18)$$

Substituting equation (17) into equation (16) yields an inter-electrode electromotive force Evc transformed into complex coordinates as follows:

$$Evc = kv \cdot b1 \cdot \exp(j \cdot \theta 1) \qquad (19)$$
$$= rkv \cdot b1 \cdot \exp\{j \cdot (\theta 1 + \theta 01)\}$$

In equation (19), $rkv \cdot b1 \cdot \exp\{j \cdot (\theta 1+\theta 01)\}$ is a complex vector having a length $rkv \cdot b1$ and an angle $\theta 1+\theta 01$ with respect to the real axis.

An inter-electrode electromotive force Eac as a combination of inter-electrode electromotive force Ec originating from a temporal change in magnetic field and an inter-electrode electromotive force Evc originating from the flow velocity of the fluid is expressed by the following equation according to equations (11) and (19).

$$Eac = Ec + Evc \quad (20)$$
$$= rk \cdot \omega 0 \cdot b1 \cdot \exp\{j \cdot (\pi/2 + \theta 1 + \theta 00)\} +$$
$$rkv \cdot b1 \cdot \exp\{j \cdot (\theta 1 + \theta 01)\}$$

As is obvious from equation (20), an inter-electrode electromotive force Eac is written by two complex vectors $rk \cdot \omega 0 \cdot b1 \cdot \exp\{j \cdot (p/2 + \theta 1 + \theta 00)\}$ and $rkv \cdot b1 \cdot \exp\{j \cdot (\theta 1 + \theta 01)\}$. The length of the resultant vector obtained by combining the two complex vectors represents the amplitude of the output (the inter-electrode electromotive force Eac), and an angle $\phi$ of the resultant vector represents the phase difference (phase delay) of the inter-electrode electromotive force Eac with respect to the phase $\omega 0 \cdot t$ of the input (exciting current). Note that a flow rate is obtained by multiplying a flow velocity by the cross-sectional area of the measuring tube. In general, therefore, a flow velocity and a flow rate have a one-to-one relationship in calibration in an initial state, and obtaining a flow velocity is equivalent to obtaining a flow rate. For this reason, the following description will exemplify the scheme of obtaining a flow velocity (for obtaining a flow rate).

Under the above principle, the electromagnetic flowmeter in the above patent reference extracts a parameter (asymmetric excitation parameter) free from the influence of a span shift, and outputs a flow rate on the basis of the extracted parameter, thereby solving the problem of the span shift.

A span shift will be described with reference to FIG. 28. Assume that the magnitude V of the flow velocity measured by the electromagnetic flowmeter has changed in spite of the fact that the flow velocity of a fluid to be measured has not changed. In such a case, a span shift can be thought as a cause of this output variation.

Assume that calibration is performed such that when the flow velocity of a fluid to be measured is 0 in an initial state, the output from the electromagnetic flowmeter becomes 0 (v), and when the flow velocity is 1 (m/sec), the output becomes 1 (v). In this case, an output from the electromagnetic flowmeter is a voltage representing the magnitude V of a flow velocity. According to this calibration, if the flow velocity of a fluid to be measured is 1 (m/sec), the output from the electromagnetic flowmeter should be 1 (v). When a given time t1 has elapsed, however, the output from the electromagnetic flowmeter may become 1.2 (v) in spite of the fact that the flow velocity of the fluid to be measured remains 1 (m/sec). A span shift can be thought as a cause of this output variation. A phenomenon called a span shift occurs when, for example, the value of an exciting current flowing in the exciting coil cannot be maintained constant.

DISCLOSURE OF INVENTION

Problem to be Solved by the Invention

A physical phenomenon necessary for explanation will be described first. When an object moves in a changing magnetic field, electromagnetic induction generates. two types of electric fields, namely (a) electric field $E^{(i)} = \partial A/\partial t$ which is generated by a temporal change in magnetic field, and (b) electric field $E^{(v)} = v \times B$ which is generated as the object moves in the magnetic field. In this case, $v \times B$ represents the outer product of v and B, $\partial A/\partial t$ represents the partial differential of A with respect to time. In this case, v, B, and A respectively correspond to the following and are vectors having directions in three dimensions (x, y, and z) (v: flow velocity, B: magnetic flow density, and A: vector potential (whose relationship with the magnetic flux density is represented by B=rotA). Note, however, that the three-dimensional vectors in this case differ in meaning from vectors on a complex plane. These two types of electric fields generate a potential distribution in the fluid, and electrodes can detect this potential.

The electromagnetic flowmeter in the above patent reference takes into consideration the angle $\theta 00$ of the vector k with respect to the real axis and the angle $\theta 01$ of the vector kv with respect to the real axis in a basic logical development. However, as a constraint for the electromagnetic flowmeter which can solve the problem of a span shift, the flowmeter is premised on $\theta 00 = \theta 01 = 0$. That is, adjusting conditions for the electromagnetic flowmeter to satisfy the premise is the constraint. Note that $\theta 1$ is an initial phase, which is a phase portion common to an exciting current and an inter-electrode electromotive force. When considering only the phase difference between an exciting current and an inter-electrode electromotive force as in the prior art and the present invention, assume that $\theta 1 = 0$, for the sake of easy understanding.

The influence of the above constraint on flow rate measurement will be described in terms of complex vectors with reference to FIG. 29. Referring to FIG. 29, reference symbol Re denotes a real axis; and Im, an imaginary axis. First of all, the inter-electrode electromotive force Ec which depends on only a temporal change in magnetic field but does not depend on the flow velocity of the fluid to be measured will be called a $\partial A/\partial t$ component, and the $\partial A/\partial t$ component is represented by a vector Va. In addition, the inter-electrode electromotive force Evc which depends on the flow velocity of the fluid to be measured will be called a $v \times B$ component, and the $v \times B$ component is represented by Vb. The above span is a coefficient by which the magnitude V of the flow velocity of the $v \times B$ component dependent on the flow velocity of the fluid to be measured is multiplied. The above definitions of $\theta 00$ and $\theta 01$ can be rephrased such that $\theta 00$ is the angle of the vector Va with respect to the imaginary axis, and $\theta 01$ is the angle of the vector Vb with respect to the real axis.

In the arrangement of the electromagnetic flowmeter shown in FIG. 25, $\theta 00 = \theta 01 = 0$ means that the vector Va exists on the imaginary axis Im, and the vector Vb exists on the real axis Re. That is, the vectors Va and Vb are orthogonal to each other. As described above, the electromagnetic flowmeter in the above patent reference is based on the premise that the vector Va of the $\partial A/\partial t$ component is orthogonal to the vector Vb of the $v \times B$ component.

In an actual electromagnetic flowmeter, however, the above premise does not always hold. This is because, although the orthogonality between the vector Va of the $\partial A/\partial t$ component and the vector Vb of the $v \times B$ component is guaranteed, the magnetic field applied to the fluid to be measured does not have an ideal distribution from a microscopic viewpoint, and hence it must be considered from a microscopic viewpoint that the vectors Va and Vb of the macroscopic $\partial A/\partial t$ and $v \times B$ components include some distortion. Therefore, it must be considered that the vectors Va and Vb are not orthogonal to each other, or $\theta 00 \neq 0$, $\theta 01 \neq 0$, and $\theta 00 \neq \theta 01$.

As is obvious from the above description, when an electromagnetic flowmeter aims at high accuracy, the orthogonality between the vectors Va and Vb must be carefully taken into consideration. However, the electromagnetic flowmeter in the above patent reference is premised on the orthogonality between the vectors Va and Vb. If, therefore, an error occurs in the orthogonality, there is a chance that the flowmeter cannot perform accurate span correction or flow rate measurement.

The present invention has been made to solve the above problem, and has as its object to provide an electromagnetic flowmeter which automatically performs accurate span correction and can perform accurate flow rate measurement.

Means of Solution to the Problem

According the present invention, there is provided an electromagnetic flowmeter according comprising a measuring tube through which a fluid to be measured flows, an electrode which is placed in the measuring tube and detects an electromotive force generated by a magnetic field applied to the fluid and a flow of the fluid, an exciting unit which applies, to the fluid, a time-changing magnetic field asymmetrical to a first plane which includes the electrode and is perpendicular to an axial direction of the measuring tube, a signal conversion unit which extracts a $\partial A/\partial t$ component irrelevant to a flow velocity of the fluid from a resultant electromotive force of an electromotive force based on the $\partial A/\partial t$ component and an electromotive force based on a v×B component originating from the flow velocity of the fluid, and a flow rate output unit which removes a variable factor for a span as a coefficient by which a magnitude V of a flow velocity of the v×B component in the resultant electromotive force is multiplied, on the basis of the extracted $\partial A/\partial t$ component, and calculates a flow rate of the fluid from a result obtained by removing the variation factor.

Effects of the Invention

According to the present invention, a span variation element is erased by extracting a $\partial A/\partial t$ component which is irrelevant to the flow velocity of a fluid from the resultant electromotive force of the electromotive force based on the $\partial A/\partial t$ component and the electromotive force based on a v×B component originating from the flow velocity of the fluid, which are detected by the electrodes, and correcting a span as a coefficient by which a magnitude V of the flow velocity of the v×B component in the resultant electromotive force is multiplied. This makes it possible to automatically perform accurate span correction and accurate flow rate measurement.

In addition, obtaining the amplitude and phase of a resultant electromotive force in each of at least two excitation states with different exciting frequencies makes it possible to extract a $\partial A/\partial t$ component on the basis of the amplitude and phase of the resultant electromotive force.

Furthermore, obtaining the amplitudes and phases of resultant electromotive forces in the first and second excitation states with different exciting frequencies makes it possible to extract the electromotive force difference between the resultant electromotive force in the first excitation state and the resultant electromotive force in the second excitation state as a $\partial A/\partial t$ component on the basis of the amplitudes and phases of the resultant electromotive forces.

Obtaining the amplitude and phase of a resultant electromotive force in each of three excitation states makes it possible to extract the electromotive force difference between the resultant electromotive force in the second excitation state and the resultant electromotive force in the third excitation state as a $\partial A/\partial t$ component on the basis of the obtained amplitude and phase. Adjusting the phase difference between the magnetic field generated from the first exciting coil and the magnetic field generated from the second exciting coil allows the resultant electromotive force in the first excitation to be an almost only electromotive force based on a v×B component, and also allows the resultant electromotive forces in the second and third excitation states to be almost only electromotive forces based on $\partial A/\partial t$ components. This makes it possible to extract a v×B component and a $\partial A/\partial t$ component more effectively and reduce computation errors.

Obtaining the amplitudes and phases of the electromotive force differences between the first resultant electromotive forces and the second resultant electromotive forces which are respectively detected by the first and second electrodes in the first and second excitation states with different exciting frequencies makes it possible to extract the difference between the electromotive force difference in the first excitation state and the electromotive force difference in the second excitation state as a $\partial A/\partial t$ component on the basis of the amplitudes and phases of these electromotive force differences. Alternatively, obtaining the amplitudes and phases of the electromotive force sums between the first resultant electromotive forces and the second resultant electromotive forces in the first and second excitation states makes it possible to extract the difference between the electromotive force sum in the first excitation state and the electromotive force sum in the second excitation state as a $\partial A/\partial t$ component on the basis of the amplitudes and phases of these electromotive force sums. Furthermore, adjusting the distance from the second plane which includes the axis of the exciting coil and is perpendicular to the axial direction of the measuring tube to the first electrode and the distance from the second plane to the second electrode allows the electromotive force sum to be an almost only electromotive force based on a v×B component, and also allows the electromotive force difference to be an electromotive force based on almost only a $\partial A/\partial t$ component. This makes it possible to extract a v×B component and a $\partial A/\partial t$ component more effectively and reduce computation errors.

In addition, obtaining the amplitude and phase of a resultant electromotive force in each of at least two excitation states with different phase differences makes it possible to approximately extract a resultant electromotive force in a specific excitation state in which the phase difference is a predetermined value as a $\partial A/\partial t$ component on the basis of the amplitude and phase of the resultant electromotive force. Since a $\partial A/\partial t$ component can be extracted from only a resultant electromotive force in a specific excitation state, there is no need to switch exciting frequencies.

Furthermore, the amplitude and phase of a resultant electromotive force are obtained in each of two excitation states, i.e., the first excitation state in which the phase difference between the first magnetic field generated by the first exciting coil and the second magnetic field generated by the second exciting coil is almost zero, and the second excitation state in which the phase difference between the first magnetic field and the second magnetic field is almost p. This makes it possible to approximately extract the resultant electromotive force in the second excitation state as a $\partial A/\partial t$ component on the basis of the amplitude and phase of the resultant electromotive force. In addition, since a $\partial A/\partial t$ component can be extracted from only the resultant electromotive force in the second excitation state, there is no need to switch exciting frequencies.

BRIEF DESCRIPTION OF DRAWINGS

FIG. 10 is a view expressing the manner of normalization processing in the form of complex vectors in the second embodiment of the present invention;

FIG. 11 is a block diagram showing the arrangement of an electromagnetic flowmeter according to the second embodiment of the present invention;

FIG. 20 is a view expressing inter-electrode electromotive forces in the form of complex vectors in the fourth embodiment of the present invention;

FIG. 21 is a view expressing the manner of normalization processing in the form of complex vectors in the fourth embodiment of the present invention;

BEST MODE FOR CARRYING OUT THE INVENTION

[Basic Principle]

The present invention takes into consideration that when a resultant vector Va+Vb of a vector Va of a ∂A/∂t component and a vector Vb of a v×B component is obtained from the inter-electrode electromotive force detected by the electrodes of the electromagnetic flowmeter, the vector Va is a vector which depends on only a temporal change in magnetic field but is irrelevant to the flow velocity of the fluid to be measured and the vector Vb is a vector which changes in proportion to the flow velocity of the fluid to be measured regardless of whether the vectors Va and Vb are orthogonal to each other.

Figure 25:
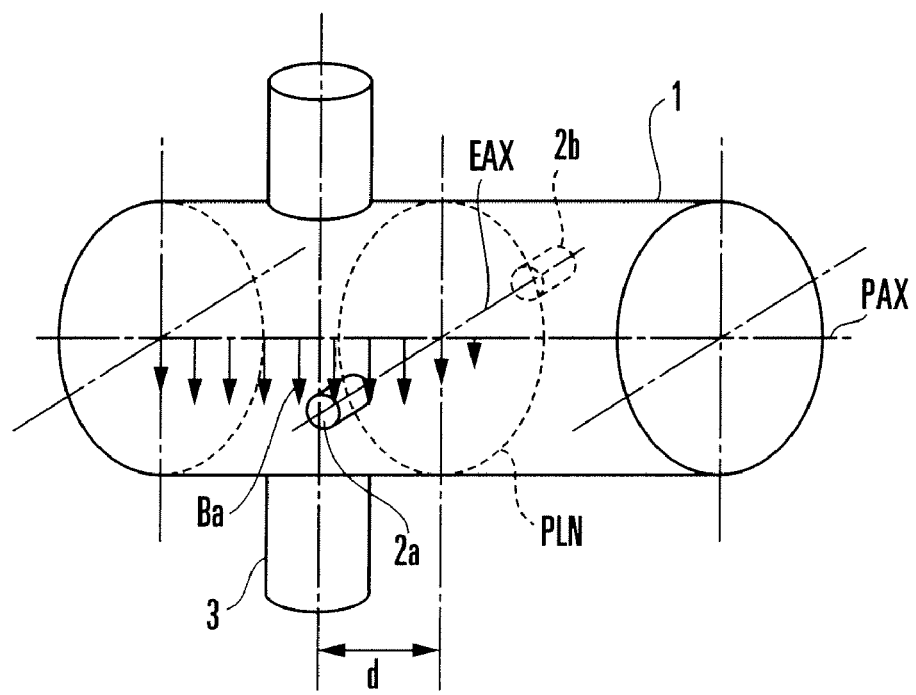
FIG. 25 is a block diagram for explaining the principle of a conventional electromagnetic flowmeter.
Figure 26:
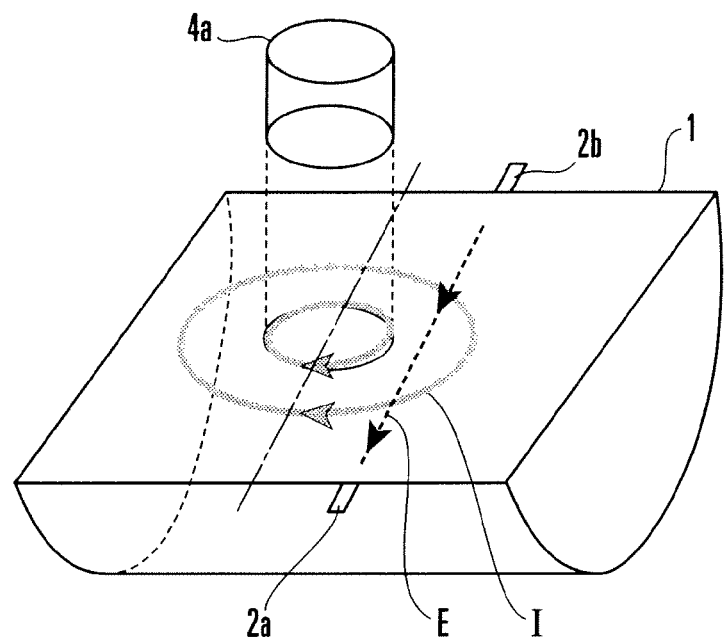
FIG. 26 is a view showing eddy currents and inter-electrode electromotive forces when the flow rate of a fluid to be measured is 0 in a conventional electromagnetic flowmeter.
Figure 27:
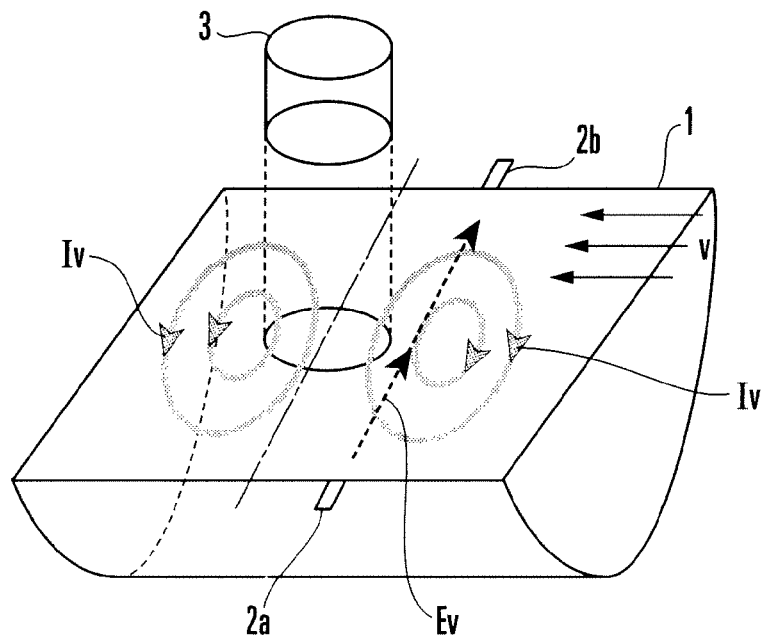
FIG. 27 is a view showing eddy currents and inter-electrode electromotive forces when the flow rate of a fluid to be measured is not 0 in a conventional electromagnetic flowmeter.
Figure 28:
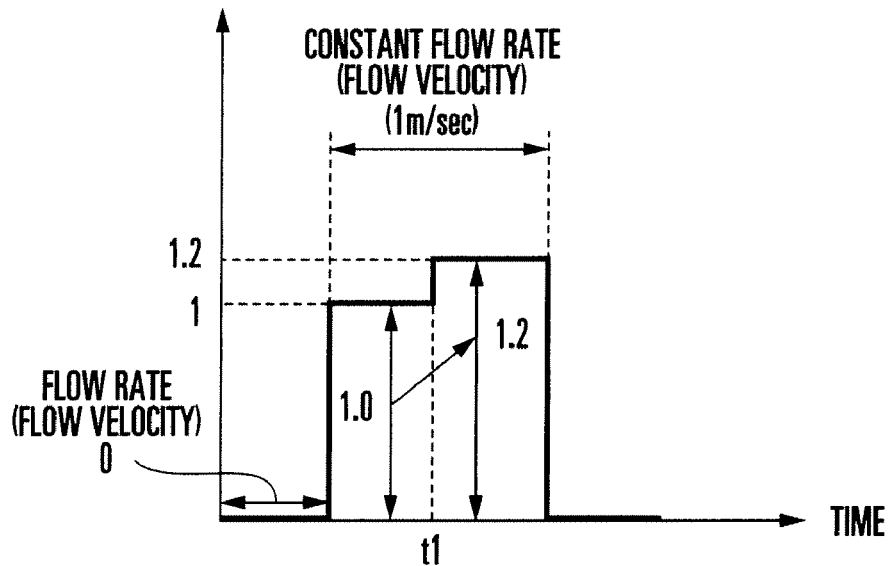
FIG. 28 is a view for explaining a span shift in the electromagnetic flowmeter.
Figure 29:
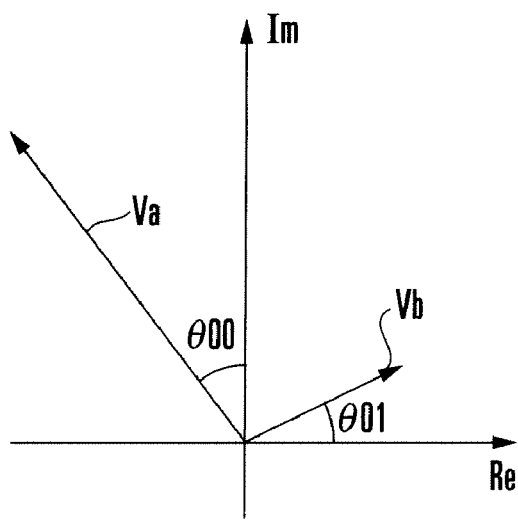
FIG. 29 is a view for explaining problems in the conventional electromagnetic flowmeter.

According to the present invention, the vector Va of the ∂A/∂t component is extracted from the resultant vector Va+Vb, and the span variation element contained in the vector Vb of the v×B component in the resultant vector Va+Vb is erased by using the vector Va. The flow rate of the fluid to be measured is calculated on the basis of the v×B component from which this span variation element is erased. It is important that extracting the vector Va of the ∂A/∂t component allows the vectors Va and Vb to be separately handled regardless of whether the vectors Va and Vb are orthogonal to each other. The conventional electromagnetic flowmeter shown in FIG. 25 is based on the premise that the vectors Va and Vb are orthogonal to each other, and hence is not designed to extract the vector Va or Vb from the resultant vector Va+Vb.

The basic principle of the present invention for actually correcting a span will be described next with reference to FIGS. 1A to 1C. As in the electromagnetic flowmeter shown in FIG. 25, when a magnetic field asymmetric on the front and rear sides of a measuring tube which are bordered on a plane which is perpendicular to the measuring tube axis and includes electrodes, with the plane serving as a boundary of the measuring tube, is applied to a fluid to be measured, the vector mapped on a complex plane on the basis of the amplitudes of the inter-electrode electromotive force and the phase difference between them, which are measured by the asymmetric excitation, corresponds to the resultant vector Va+Vb of the vector Va of the ∂A/∂t component and the vector Vb of the v×B component.

$$Va = r\omega \cdot \exp(j \cdot \theta\omega) \cdot C \cdot \omega \quad (21)$$

$$Vb = rv \cdot \exp(j \cdot \theta v) \cdot C \cdot V \quad (22)$$

Figure 1A:
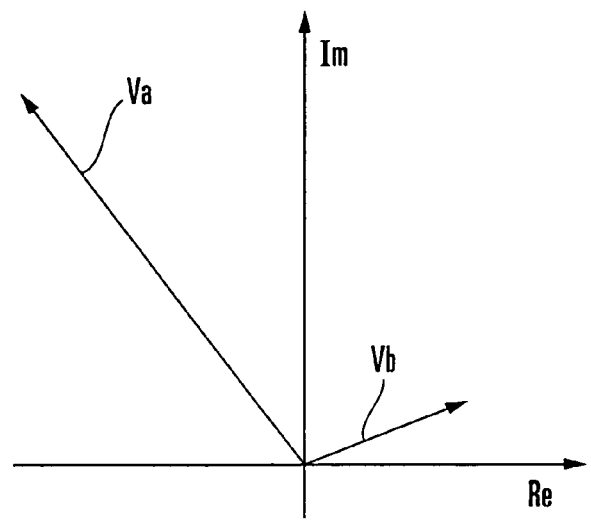
FIG. 1A is a view showing a $\partial A/\partial t$ component vector and a v×B component vector.

FIG. 1A shows the vectors Va and Vb. The vector Va of the ∂A/∂t component is the electromotive force generated by a change in magnetic field, and hence has a magnitude proportional to an exciting angular frequency ω. Letting rω be a known proportional constant portion corresponding to the magnitude of the vector Va, and θω be the direction of the vector Va, C is given as an element which changes, like a magnetic field shift, i.e., a span variation element. In addition, the vector Vb of the v×B component is the electromotive force generated by the movement of the fluid to be measured in the measuring tube, and hence has a magnitude proportional to the magnitude V of the flow velocity. In this case, letting rv be a known proportional constant portion corresponding the magnitude of the vector Vb, and θv be the direction of the vector, C is given as a span variation element. Note that C of the vector Va represented by equation (21) and C of the vector Vb represented by equation (22) are identical elements.

A factor for a span shift is a change in the span variation element C. Therefore, obtaining the flow velocity of the fluid to be measured by a signal conversion expression from which the span variation element C is erased makes it possible to substantially implement automatic span correction. The following two methods are available as specific methods for span correction.

According to the first correction method, the span variation element C is erased by normalizing the vector Vb of the v×B component with the vector Va of the ∂A/∂t component, and automatic span correction in flow rate measurement is implemented by a signal conversion expression associated with the magnitude V of the flow velocity based on the normalized vectors. The following mathematically represents the normalization of the first correction method:

$$Vb/Va = \{rv \cdot \exp(j \cdot \theta v) \cdot C \cdot V\}/\{r\omega \cdot \exp(j \cdot \theta \omega) \cdot C \cdot \omega\} \quad (23)$$
$$= (rv/r\omega) \cdot \exp\{j \cdot (\theta v - \theta \omega)\} \cdot V/\omega$$
$$|Vb/Va| = (rv/r\omega) \cdot V/\omega \quad (24)$$

Figure 1B:
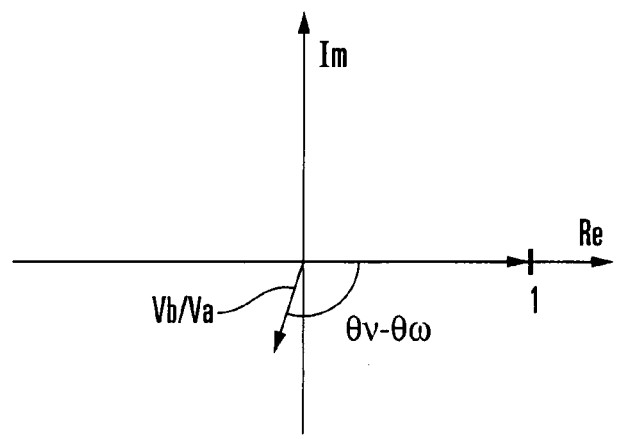
FIG. 1B is a view showing a vector obtained by normalizing the v×B component vector with the $\partial A/\partial t$ component vector.
Figure 1C:
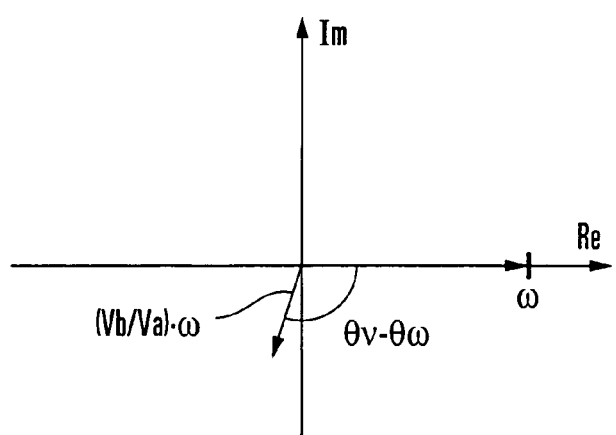
FIG. 1C is a view showing a vector obtained by multiplying the vector in FIG. 1B by an exciting angular frequency.

FIG. 1B shows the vector obtained by normalizing the vector Vb of the v×B component with the vector Va of the ∂A/∂t component. Note that the vector shown in FIG. 1C is the vector obtained by erasing the exciting angular frequency ω from the right side of equation (23) by multiplying the vector in FIG. 1B by the exciting angular frequency ω.

According to the second correction method, the span variation element C is erased by normalizing the resultant vector Va+Vb with the vector Va of the ∂A/∂t component, and automatic span correction in flow rate measurement is implemented by using a signal conversion expression associated with the magnitude V of the flow velocity based on the normalized vector. The following mathematically represents the normalization of the second correction method:

$$(Va + Vb)/Va = \{r\omega \cdot \exp(j \cdot \theta\omega) \cdot C \cdot \omega + rv \cdot \exp(j \cdot \theta v) \cdot C \cdot V/ \quad (25)$$
$$\{r\omega \cdot \exp(j \cdot \theta\omega) \cdot C \cdot \omega\}$$
$$= 1 + (rv/r\omega) \cdot \exp\{j \cdot (\theta v - \theta\omega)\} \cdot V/\omega$$
$$|(Va + Vb)/Va - 1| = (rv/r\omega) \cdot V/\omega \quad (26)$$

The second correction method provides more practical processing than the first correction method. This is because the vector Vb of the v×B component cannot be directly obtained from the inter-electrode electromotive force obtained by the electromagnetic flowmeter, and the vector that can be obtained from the inter-electrode electromotive force is Va+Vb.

The following two methods are available as methods of extracting the vector Va of the ∂A/∂t component. The first extraction method is a method of extracting the vector Va from inter-electrode electromotive forces in two excitation states with different exciting angular frequencies ω. As described above, the complex vector that can be directly obtained from the inter-electrode electromotive forces is the resultant vector Va+Vb, and the vectors Va and Vb cannot be directly measured. It is therefore noted that the magnitude of the vector Va of the ∂A/∂t component is proportional to the exciting angular frequency ω, and the vector Vb of the v×B component does not depend on the exciting angular frequency ω. More specifically, this method obtains the difference between the resultant vector Va+Vb obtained when excitation is performed with a given angular frequency ω0 and the resultant vector Va+Vb obtained when excitation is performed with another angular frequency ω1. This difference corresponds to a vector representing only a change in the magnitude of the vector Va, which therefore allows to extract the vector Va.

The second extraction method is a method which can be applied to an electromagnetic flowmeter including at least two exciting coils arranged to face each other through an electrode plane. This method extracts the vector Va by using the phase difference between the magnetic field generated from the first exciting coil and the magnetic field generated from the second exciting coil. In the second extraction method, it is noted that the direction of the ∂A/∂t component generated by the first exciting coil is opposite to the direction of the ∂A/∂t component generated by the second exciting coil, and the direction of the v×B component generated by the first exciting coil is the same as the direction of the v×B component generated by the second exciting coil.

More specifically, when the phase difference between the magnetic field generated by the first exciting coil and the magnetic field generated by the second exciting coil is made almost zero by equalizing the magnetic fields, the ∂A/∂t component generated by the first exciting coil cancels out the ∂A/∂t component generated by the second exciting coil. This makes it possible to extract the vector Vb of the sum of the v×B component generated by the first exciting coil and the v×B component generated by the second exciting coil from the inter-electrode electromotive force. In addition, when the phase difference between the two magnetic fields is made almost p, the v×B component generated by the first exciting coil cancels out the v×B component generated by the second exciting coil. This makes it possible to extract the vector Va of the sum of the ∂A/∂t component generated by the first exciting coil and the ∂A/∂t component generated by the second exciting coil from the inter-electrode electromotive force.

Using the normalization result obtained by the first correction method of normalizing the vector Vb of the v×B component with the vector Va of the ∂A/∂t component makes it possible to calculate the magnitude V of the flow velocity of the fluid to be measured as follows:

$$V=(r\omega/rv)\cdot|Vb/Va|\cdot\omega \quad (27)$$

In addition, using the normalization result obtained by the second correction method of normalizing the resultant vector Va+Vb with the vector Va of the ∂A/∂t component makes it possible to calculate the magnitude V of the flow velocity of the fluid to be measured as follows:

$$V=(r\omega/rv)\cdot\{|(Va+Vb)/Va-1|\}\cdot\omega \quad (28)$$

According to the above principle, the magnitude V of the flow velocity can be measured independently of the span variation element C such as a magnetic field shift, and hence automatic span correction can be substantially implemented.

First Embodiment

The first embodiment of the present invention will be described in detail below with reference to the accompanying drawings. This embodiment uses the first extraction method of the methods described in association with the basic principle as a method of extracting a vector Va of a ∂A/∂t component, and uses the second correction method as a span correction method. An electromagnetic flowmeter according to this embodiment includes one exciting coil and a pair of electrodes, and has the same arrangement as that of the conventional electromagnetic flowmeter shown in FIG. 25 except for the signal processing system. The principle of this embodiment will therefore be described by using reference numerals in FIG. 25.

The relationship between an angle θ00 of the vector Va with respect to the imaginary axis and an angle θ01 of a vector Vb with respect to the real axis is defined as θ01=θ00+Δθ01, a state wherein an exciting angular frequency is ω0 is defined as the first excitation state, and an inter-electrode electromotive force Eac in the first excitation state is represented by E10. In this case, substituting equation (18) into equation (20) yields the inter-electrode electromotive force E10 represented by the following equation:

$$E10 = rk \cdot \omega 0 \cdot b1 \cdot \exp\{j \cdot (\pi/2 + \theta 1 + \theta 00)\} + \gamma \cdot rk \cdot V \cdot b1 \cdot \exp\{j \cdot (\theta 1 + \theta 00 + \Delta\theta 01)\}$$
$$= rk \cdot b1 \cdot \exp\{j \cdot (\theta 1 + \theta 00)\} \cdot \{\omega 0 \cdot \exp(j \cdot \pi/2) + \gamma \cdot V \cdot \exp(j \cdot \Delta\theta 01)\} \quad (29)$$

In addition, if a state wherein the exciting angular frequency in the first excitation state has been changed from ω0 to ω1 is defined as the second excitation state, and the inter-electrode electromotive force Eac in the second excitation state is represented by E11, the inter-electrode electromotive force E11 is represented by the following equation according to equation (29).

$$E11 = rk \cdot b1 \cdot \exp\{j \cdot (\theta 1 + \theta 00)\} \cdot \{\omega 1 \cdot \exp(j \cdot \pi/2) + \gamma \cdot V \cdot \exp(j \cdot \Delta\theta 01)\} \quad (30)$$

Letting EdA1 be the result obtained by multiplying the difference between the inter-electrode electromotive forces E10 and E11 by ω0/(ω0−ω1), equation (31) holds:

$$EdA1 = (E10 - E11) \cdot \omega 0 / (\omega 0 - \omega 1) \quad (31)$$
$$= rk \cdot b1 \cdot \exp\{j \cdot (\theta 1 + \theta 00)\} \cdot$$
$$\{\omega 0 \cdot \exp(j \cdot \pi/2) +$$
$$\gamma \cdot V \cdot \exp(j \cdot \Delta\theta 01) -$$
$$\omega 1 \cdot \exp(j \cdot \pi/2) -$$
$$\gamma \cdot V \cdot \exp(j \cdot \Delta\theta 01)\}$$
$$\cdot \omega 0 / (\omega 0 - \omega 1)$$
$$= rk \cdot \omega 0 \cdot b1 \cdot \exp\{j \cdot (\pi/2 + \theta 1 + \theta 00)\}$$

Figure 2:
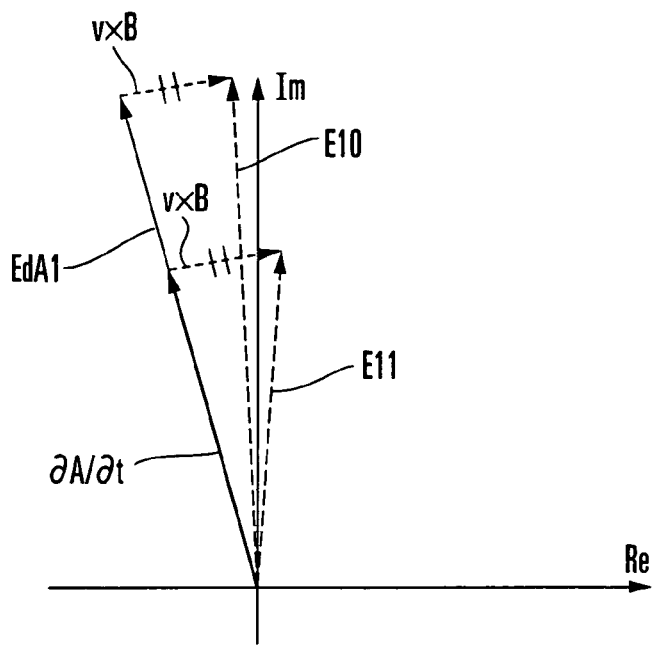
FIG. 2 is a view expressing inter-electrode electromotive forces and an electromotive force difference in the form of complex vectors in the first embodiment of the present invention.

The inter-electrode electromotive force EdA1 is irrelevant to a magnitude V of the flow velocity, and hence is only the component generated by ∂A/∂t. The electromotive force difference EdA1 is used to normalize a coefficient (span) by which the magnitude V of the flow velocity of the v×B component in the inter-electrode electromotive force E10 (the resultant vector Va+Vb) is multiplied. FIG. 2 is a view expressing the above inter-electrode electromotive forces E10 and E11 and the electromotive force difference EdA1 in the form of complex vectors. Referring to FIG. 2, reference symbol Re denotes a real axis; and Im, an imaginary axis. Referring to FIG. 2, reference symbol v×B denotes a v×B component rk·b1·exp{j·(θ1+θ00)}·γ·V·exp(j·Δθ01) of the inter-electrode electromotive forces E10 and E11; and ∂A/at, a ∂A/←t component rk·b1·exp{j·(θ1+θ00)}·ω1·exp(j·p/2) of the inter-electrode electromotive force E11. To be precise, the electromotive force difference EdA1 is the value obtained by multiplying the electromotive force difference between the inter-electrode electromotive forces E10 and E11 by ω0/(ω0−ω1). However, the reason why this electromotive force difference is multiplied by ω0/(ω0−ω1) is to facilitate the development of an equation.

Letting En1 be the result obtained by normalizing the inter-electrode electromotive force E10 given by equation (29) with the electromotive force difference EdA1 given by equation (31) and multiplying the normalization result by ω0, the normalized electromotive force En1 is given by equation (32):

$$En1 = (E10 / EdA1) \cdot \omega 0 \quad (32)$$
$$= rk \cdot b1 \cdot \exp\{j \cdot (\theta 1 + \theta 00)\} \cdot$$
$$\{\omega 0 \cdot \exp(j \cdot \pi/2) + \gamma \cdot V \cdot \exp(j \cdot \Delta\theta 01)\} /$$
$$[rk \cdot \omega 0 \cdot b1 \cdot \exp\{(j \cdot (\pi/2 + \theta 1 + \theta 00)\} \cdot \omega 0$$
$$= \omega 0 + [\gamma \cdot \exp\{j \cdot (-\pi/2 + \Delta\theta 01)\}] \cdot V$$

Figure 3:
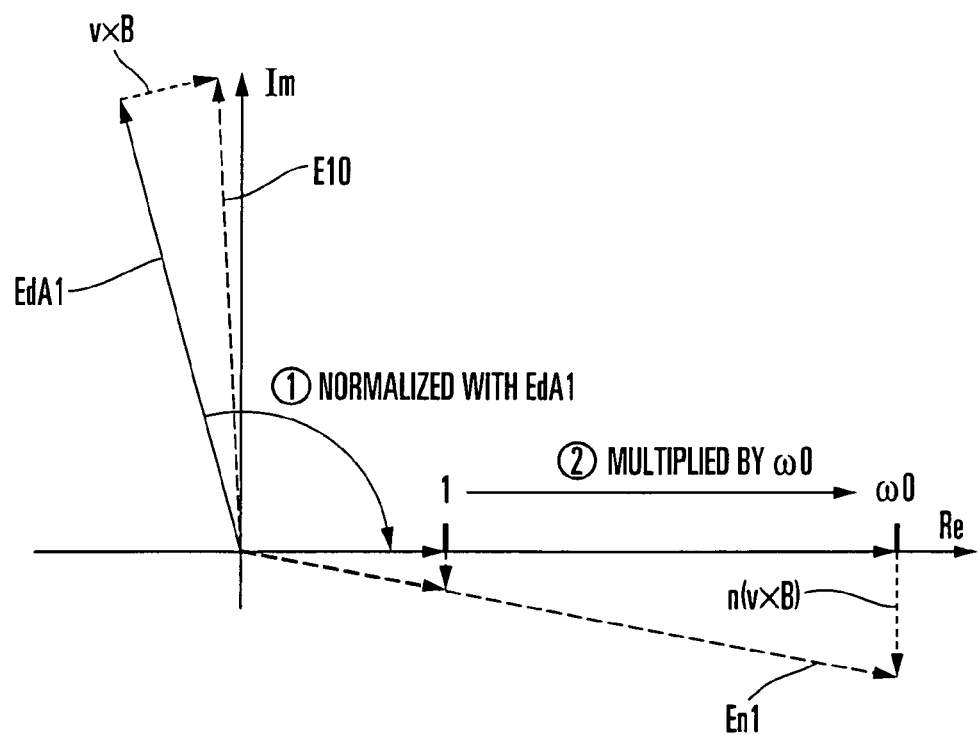
FIG. 3 is a view expressing the manner of normalization processing in the form of complex vectors in the first embodiment of the present invention.

The second term of the right side of equation (32) is the term obtained by normalizing the component generated by v×B with the component generated by ∂A/∂t. FIG. 3 is a view expressing the manner of the above normalization processing in the form of complex vectors. Referring to FIG. 3, reference symbol v×B denotes a v×B component rk·b1·exp{j·(θ1+θ00)}·γ·V·exp(j·Δθ01) of the inter-electrode electromotive force E10; and n(v×B), a normalized v×B component [γ·exp{j·(−p/2+Δθ01)}]·V. The reason why the result obtained by normalizing the inter-electrode electromotive force E10 with the electromotive force difference EdA1 is multiplied by ω0 is to erase the exciting angular frequency ω0 from the second term of the right side associated with the magnitude V of the flow velocity. According to equation (32), the complex coefficient by which the magnitude V of the flow velocity is multiplied has the magnitude of γ and the angle of −p/2+Δθ01 with respect to the real axis. The coefficient γ and the angle Δθ01 are constants which can be obtained in advance by calibration and the like, and the second term of the right side of equation (32) remains constant unless the flow velocity of the fluid to be measured changes.

Normalizing the v×B component by using the ∂A/∂t component makes it possible to implement span correction of automatically correcting an error due to a magnetic field shift or phase change. According to equation (32), the magnitude V of the flow velocity is expressed by $$V = |(En1 - \omega 0) / [\gamma \cdot \exp\{j \cdot (-\pi/2 + \Delta\theta 01)\}]| \quad (33)$$
$$= |(En1 - \omega 0)| / \gamma$$

Table 1 shows the correspondence relationship between the constants and variables used in the basic principle described above and the constants and variables in this embodiment. As is obvious from Table 1, this embodiment is an example of specifically implementing the basic principle described above.

TABLE 1

Correspondence Relationship between Basic Principle and First Embodiment

| Constants and Variables in Basic Principle | Constants and Variables in First Embodiment |
|---|---|
| rω | 1 |
| rv | γ |
| θω | π/2 |
| θv | Δθ01 |
| C | rk · b1 · exp{j(θ1 + θ00)} |

Figure 4:
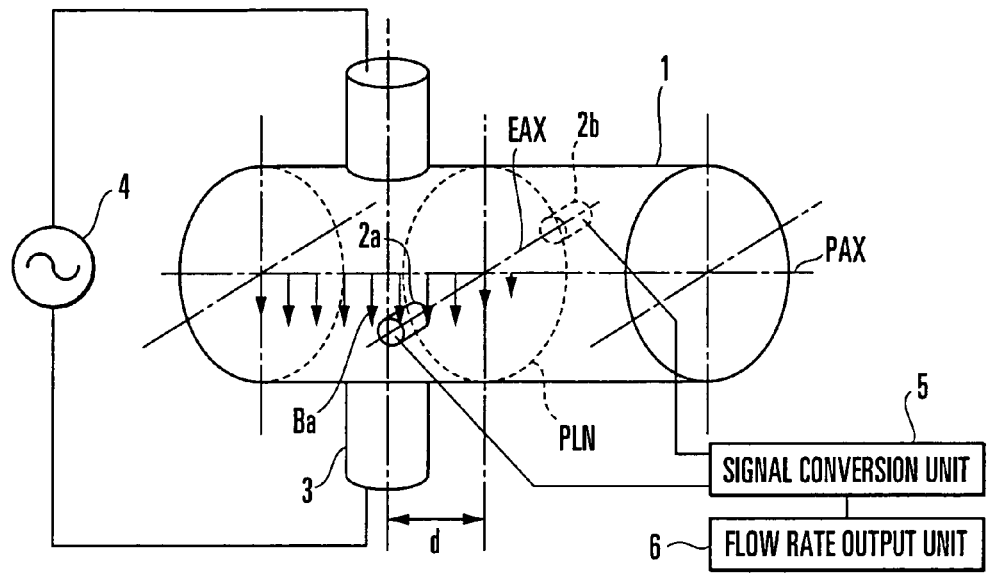
FIG. 4 is a block diagram showing the arrangement of an electromagnetic flowmeter according to the first embodiment of the present invention.

A specific arrangement of the electromagnetic flowmeter of this embodiment and its operation will be described next. FIG. 4 is a block diagram showing the arrangement of the electromagnetic flowmeter according to this embodiment. The same reference numerals as in FIG. 4 denote the same components in FIG. 25. The electromagnetic flowmeter according to this embodiment includes a measuring tube 1, electrodes 2a and 2b, an exciting coil 3 placed at a position spaced apart by an offset distance d in the axial direction from a plane PLN which includes the electrodes 2a and 2b and is perpendicular to the direction of a measuring tube axis PAX, a power supply unit 4 which supplies an exciting current to the exciting coil 3 while switching exciting frequencies, a signal conversion unit 5 which obtains the amplitudes and phases of resultant electromotive forces in the first and second excitation states with different exciting frequencies, and extracts the electromotive force difference between the resultant electromotive force in the first excitation state and the resultant electromotive force in the second excitation state as a ∂A/∂t component on the basis of the amplitudes and phases of the resultant electromotive forces, and a flow rate output unit 6 which removes a variation factor for a span contained in the v×B component in the resultant electromotive force in the first excitation state on the basis of the extracted ∂A/∂t component, and calculates the flow rate of the fluid to be measured from the result obtained by removing the variation factor. The exciting coil 3 and the power supply unit 4 constitute an exciting unit which applies a time-changing magnetic field asymmetric to the plane PLN to the fluid to be measured.

The power supply unit 4 repeats, in a T-sec cycle, the operation of continuing the first excitation state for T0 sec in which an exciting current with an angular frequency ω0 is supplied to the exciting coil 3 and then continuing the second excitation state for T1 sec in which an exciting current with an angular frequency ω1 is supplied to the exciting coil 3. That is, T=T0+T1.

Figure 5:
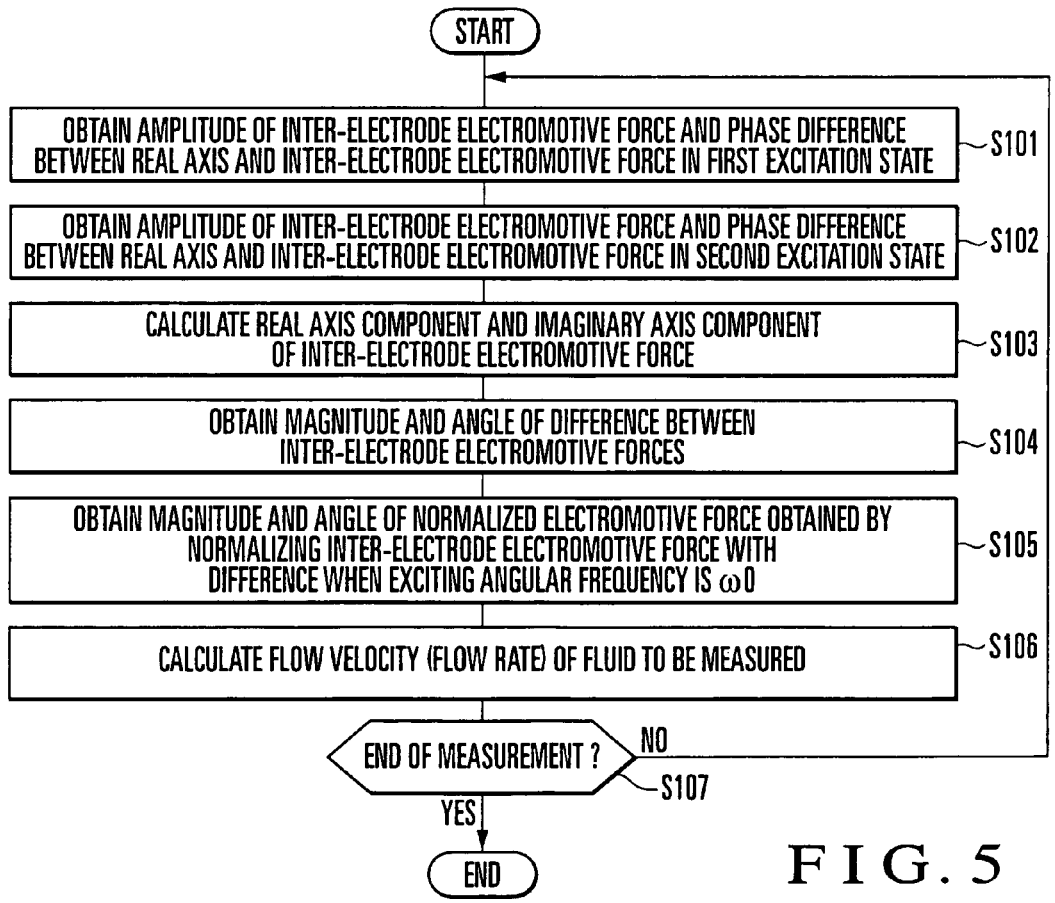
FIG. 5 is a flowchart showing the operations of a signal conversion unit and flow rate output unit according to the first embodiment of the present invention.

FIG. 5 is a flowchart showing the operations of the signal conversion unit 5 and flow rate output unit 6. First of all, the signal conversion unit 5 causes a phase detector (not shown) to obtain an amplitude r10 of the electromotive force E10 between the electrodes 2a and 2b in the first excitation state with the exciting angular frequency ω0, and obtain a phase difference φ10 between the real axis and the inter-electrode electromotive force E10 (step S101 in FIG. 5).

Subsequently, the signal conversion unit 5 causes the phase detector (not shown) to obtain an amplitude r11 of the electromotive force E11 between the electrodes 2a and 2b in the second excitation state with the exciting angular frequency ω1, and obtain a phase difference φ11 between the real axis and the inter-electrode electromotive force E11 (step S102).

The signal conversion unit 5 then calculates a real axis component E10x and imaginary axis component E10y of the inter-electrode electromotive force E10, and a real axis component E11x and imaginary axis component E11y of the inter-electrode electromotive force E11 according to the following equations (step S103):

$$E10x = r10 \cdot \cos(\phi 10) \tag{34}$$

$$E10y = r10 \cdot \sin(\phi 10) \tag{35}$$

$$E11x = r11 \cdot \cos(\phi 11) \tag{36}$$

$$E11y = r11 \cdot \sin(\phi 11) \tag{37}$$

After the calculation of equations (34) to (37), the signal conversion unit 5 obtains the magnitude and angle of the electromotive force difference EdA1 between the inter-electrode electromotive forces E10 and E11 (step S104). The processing in step S104 corresponds to the processing of obtaining a ∂A/∂t component and a v×B component, and is equivalent to the calculation of equation (31). The signal conversion unit 5 calculates a magnitude |EdA1| of the electromotive force difference EdA1 between the inter-electrode electromotive forces E10 and E11 according to the following equation:

$$|EdA1| = \{(E10x - E11x)^2 + (E10y - E11y)^2\}^{1/2} \cdot \omega 0/(\omega 0 - \omega 1) \tag{38}$$

The signal conversion unit 5 then calculates an angle ∠EdA1 of the electromotive force difference EdA1 with respect to the real axis according to the following equation:

$$\angle EdA1 = \tan^{-1}\{(E10y - E11y)/(E10x - E11x)\} \tag{39}$$

With the above operation, the processing in step S104 is complete.

The flow rate output unit 6 then obtains the magnitude and angle of the normalized electromotive force En1 obtained by normalizing the inter-electrode electromotive force E10 with the electromotive force difference EdA1 (step S105). The processing in step S105 is equivalent to the calculation of equation (32). The flow rate output unit 6 calculates a magnitude |En1| of the normalized electromotive force En1 according to the following equation:

$$|En1| = (r10/|EdA1|) \cdot \omega 0 \tag{40}$$

The flow rate output unit 6 also calculates an angle ∠En1 of the normalized electromotive force En1 with respect to the real axis according to the following equation:

$$\angle En1 = \phi 10 - \angle EdA1 \tag{41}$$

With this operation, the processing in step S105 is complete.

The flow rate output unit 6 then calculates the magnitude V of the flow velocity of the fluid to be measured (step S106). The processing in step S106 is equivalent to the calculation of equation (33). The flow rate output unit 6 calculates a real axis component En1x of (En1−ω0) and an imaginary axis component En1y of En1−ω0) according to the following equations:

$$En1x = |En1|\cos(\angle En1) - \omega 0 \tag{42}$$

$$En1y = |En1|\sin(\angle En1) \tag{43}$$

The flow rate output unit 6 then calculates the magnitude V of the flow velocity of the fluid to be measured according to the following equation:

$$V = (En1x^2 + En1y^2)^{1/2}/\gamma \tag{44}$$

With this operation, the processing in step S106 is complete.

The signal conversion unit 5 and the flow rate output unit 6 perform the processing in steps S101 to S106 described above in a cycle T until, for example, the end of the measurement is designated by the operator (YES in step S107). Note that the processing in steps S102 to S106 is performed in the second excitation state for a duration of T1 sec.

As described above, this embodiment is configured to extract the electromotive force difference EdA1 (the vector Va of the ∂A/∂t component) from the inter-electrode electromotive forces E10 and E11 in the two excitation states with different exciting frequencies and normalize a span by which the magnitude V of the flow velocity of the v×B component in the inter-electrode electromotive force E10 (resultant vector Va+Vb) is multiplied by using the electromotive force difference EdA1, thereby erasing the span variation element. Therefore, the embodiment can automatically perform accurate span correction and can execute accurate flow rate measurement.

Second Embodiment

The second embodiment of the present invention will be described next. This embodiment is the same as the first embodiment except that one exciting coil is added to the electromagnetic flowmeter, and uses the first extraction method as a method of extracting a vector Va of a ∂A/∂t component and the second correction method as a span correction method. That is, the electromagnetic flowmeter of this embodiment includes two exciting coils and a pair of electrodes. If the second exciting coil to be newly added is placed on the same side as the first exciting coil, the resultant arrangement is a redundant arrangement of the first embodiment. Therefore, the second exciting coil needs to be placed on a side different from that of the first exciting coil through a plane including the electrodes.

Figure 6:
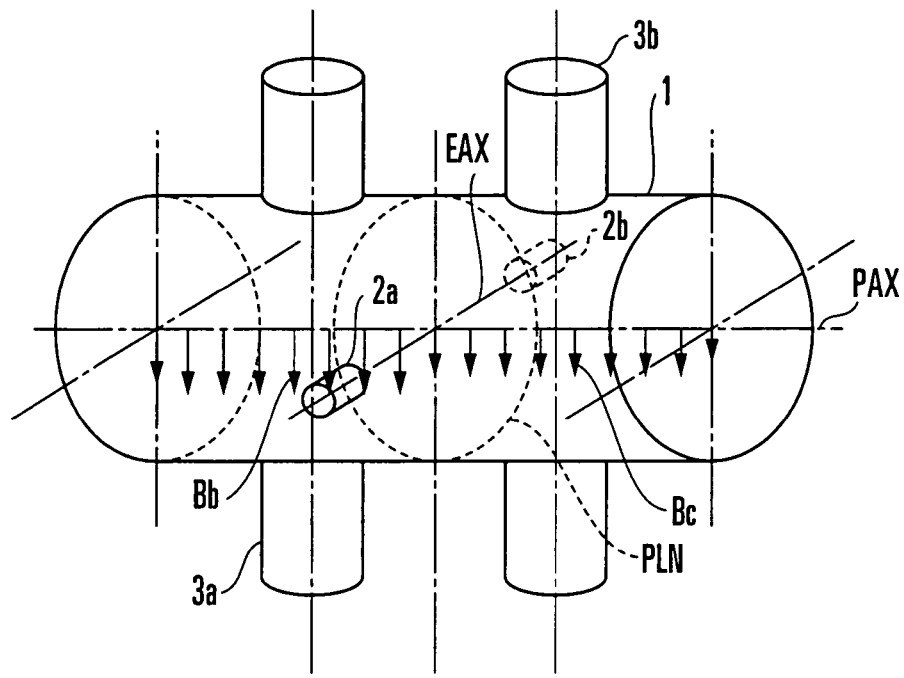
FIG. 6 is a block diagram for explaining the principle of an electromagnetic flowmeter according to the second embodiment of the present invention.

FIG. 6 is a block diagram for explaining the principle of the electromagnetic flowmeter of this embodiment. This electromagnetic flowmeter includes a measuring tube 1, electrodes 2a and 2b, a first exciting coil 3a and second exciting coil 3b which apply, to a fluid to be measured, time-changing magnetic fields asymmetric on the front and rear sides of the measuring tube 1 which are bordered on a plane PLN which is perpendicular to the direction of a measuring tube axis PAX and includes the electrodes 2a and 2b, with the plane PLN serving as a boundary of the measuring tube 1. The first exciting coil 3a is placed at a position spaced apart from the plane PLN by an offset distance d1 to, for example, the downstream side. The second exciting coil 3b is placed at a position spaced apart from the plane PLN by an offset distance d2 to, for example, the upstream side so as to face the first exciting coil 3a through the plane PLN.

Assume that a magnetic field component (magnetic flux density) B2, of a magnetic field Bb generated from the first exciting coil 3a, which is orthogonal to both an electrode axis EAX connecting the electrodes 2a and 2b and a measuring tube axis PAX on the electrode axis EAX, and a magnetic field component (magnetic flux density) B3, of a magnetic field Bc generated from the second exciting coil 3b, which is orthogonal to both the electrode axis EAX and the measuring tube axis PAX on the electrode axis EAX are given by $$B2 = b2 \cdot \cos(\omega 0 \cdot t - \theta 2) \quad (45)$$

$$B3 = b3 \cdot \cos(\omega 0 \cdot t - \theta 3) \quad (46)$$

In equations (45) and (46), b2 and b3 are the amplitudes of the magnetic flux densities B2 and B3, ω0 is an angular frequency, and θ2 and θ3 are phase differences (phase lags) between the magnetic flux densities B2 and B3 and ω0·t. The magnetic flux densities B2 and B3 will be respectively referred to as the magnetic fields B2 and B3 hereinafter.

Figure 7:
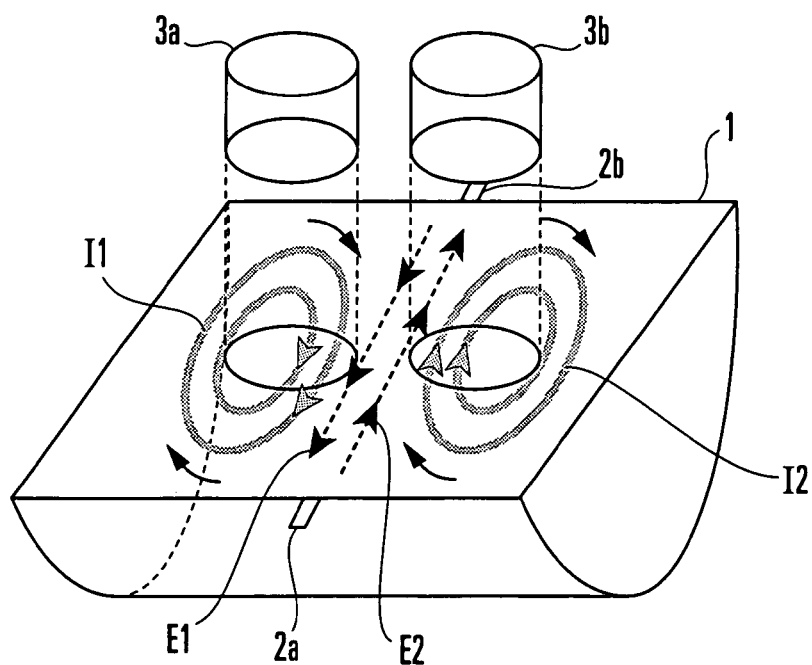
FIG. 7 is a view showing eddy currents and inter-electrode electromotive forces when the flow rate of a fluid to be measured is 0 in the second embodiment of the present invention.

If the flow velocity of the fluid to be measured is 0, a generated eddy current is only a component originating from a change in magnetic field. An eddy current I1 due to a change in the magnetic field Bb and an eddy current I2 due to a change in the magnetic field Bc are directed as shown in FIG. 7. Therefore, an inter-electrode electromotive force E1 which is generated by a change in the magnetic field Bb and is irrelevant to the flow velocity and an inter-electrode electromotive force E2 which is generated by a change in the magnetic field Bc and is irrelevant to the flow velocity are directed opposite to each other within a plane including the electrode axis EAX and the measuring tube axis PAX, as shown in FIG. 7.

Figure 8:
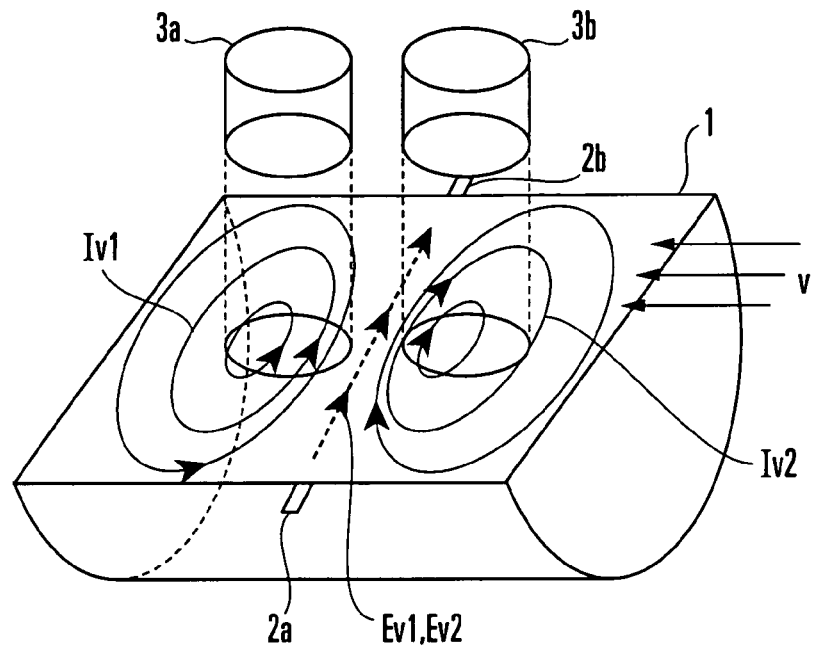
FIG. 8 is a view showing eddy current and inter-electrode electromotive forces when the flow rate of a fluid to be measured is 0 in the second embodiment of the present invention.

If the flow velocity of the fluid to be measured is V (V≠0), components v×Bb and v×Bc originating from a flow velocity vector v of the fluid to be measured are generated in the generated eddy currents in addition to the eddy currents I1 and I2 generated when the flow velocity is 0. For this reason, an eddy current Iv1 originating from the flow velocity vector v and the magnetic field Bb and an eddy current Iv2 originating from the flow velocity vector v and the magnetic field Bc are directed as shown in FIG. 8. Consequently, an inter-electrode electromotive force Ev1 generated by the flow velocity vector v and the magnetic field Bb and an inter-electrode electromotive force Ev2 generated by the flow velocity vector v and the magnetic field Bc have the same direction.

Considering the directions of the inter-electrode electromotive forces described with reference to FIGS. 7 and 8, an overall inter-electrode electromotive force Eac2 obtained by combining the inter-electrode electromotive force originating from a temporal change in magnetic field and the inter-electrode electromotive force originating from the flow velocity of the fluid to be measured is expressed by $$\begin{aligned} Eac2 = {} & rk \cdot \omega 0 \cdot b2 \cdot \exp\{j \cdot (\pi/2 + \theta 2 + \theta 00)\} + \\ & rk \cdot \omega 0 \cdot b3 \cdot \exp\{j \cdot (-\pi/2 + \theta 3 + \theta 00)\} + \\ & rkv \cdot b2 \cdot \exp\{j \cdot (\theta 2 + \theta 01)\} + rkv \cdot b3 \cdot \exp\{j \cdot (\theta 3 + \theta 01)\} \end{aligned} \quad (47)$$

Assume that the first excitation state is a state wherein θ3=θ2+Δθ3 represents the relationship between a phase lag θ2 of the magnetic field B2 with respect to ω0·t and a phase lag θ3 of the magnetic field B3 with respect to ω0·t, and θ01=θ00+Δθ01 represents the relationship between an angle θ00 of a vector Va with respect to the imaginary axis and an angle θ01 of a vector Vb with respect to the real axis. In this case, letting E20 be the inter-electrode electromotive force Eac2 in the first excitation state, the inter-electrode electromotive force E20 obtained when equation (18) is substituted into equation (47) is given by $$\begin{aligned} E20 = {} & rk \cdot \omega 0 \cdot b2 \cdot \exp\{j \cdot (\pi/2 + \theta 2 + \theta 00)\} + \\ & rk \cdot \omega 0 \cdot b3 \cdot \exp\{j \cdot (-\pi/2 + \theta 2 + \Delta\theta 3 + \Delta\theta 00)\} + \\ & \gamma \cdot rk \cdot V \cdot b2 \cdot \exp\{j \cdot (\theta 2 + \theta 00 + \Delta\theta 01)\} + \\ & \gamma \cdot rk \cdot V \cdot b3 \cdot \exp\{j \cdot (\theta 2 + \Delta\theta 3 + \theta 00 + \Delta\theta 01)\} \\ = {} & rk \cdot \exp\{j \cdot (\theta 2 + \theta 00)\} \cdot \\ & [\omega 0 \cdot \exp(j \cdot \pi/2) \cdot \{b2 - b3 \cdot \exp(j \cdot \Delta\theta 3)\} + \\ & \gamma \cdot V \cdot \exp(j \cdot \Delta\theta 01) \cdot \{b2 + b3 \cdot \exp(j \cdot \Delta\theta 3)\}] \end{aligned} \quad (48)$$

Assume that the second excitation state is a state wherein the phase difference between the magnetic fields B2 and B3 has changed from that in the first excitation state by a constant value p (θ3=p+θ2+Δθ3, and θ01=θ00+Δθ01. In this case, letting E2p0 be the inter-electrode electromotive force Eac2 in the second excitation state, the inter-electrode electromotive force E2p0 obtained when equation (18) is substituted into equation (47) is given by $$E2\pi0 = rk \cdot \omega0 \cdot b2 \cdot \exp\{j \cdot (\pi/2 + \theta2 + \theta00)\} + \quad (49)$$
$$rk \cdot \omega0 \cdot b3 \cdot \exp\{j \cdot (\pi/2 + \theta2 + \Delta\theta3 + \theta00)\} +$$
$$\gamma \cdot rk \cdot V \cdot b2 \cdot \exp\{j \cdot (\theta2 + \theta00 + \Delta\theta01)\} +$$
$$\gamma \cdot rk \cdot V \cdot b3 \cdot \exp\{j \cdot (\pi + \theta2 + \Delta\theta3 + \theta00 + \Delta\theta01)\}$$
$$= rk \cdot \exp\{j \cdot (\theta2 + \theta00)\} \cdot$$
$$[\omega0 \cdot \exp(j \cdot \pi/2) \cdot \{b2 + b3 \cdot \exp(j \cdot \Delta\theta3)\} +$$
$$\gamma \cdot V \cdot \exp(j \cdot \Delta\theta01) \cdot \{b2 - b3 \cdot \exp(j \cdot \Delta\theta3)\}]$$

Assume that the third excitation state is a state wherein the exciting angular frequency in the second excitation state has changed from ω0 to ω1. In this case, letting E2p1 be the inter-electrode electromotive force Eac2 in the third excitation state, the inter-electrode electromotive force E2p1 is given by the following equation according to equation (49):

$$E2\pi1 = rk \cdot \exp\{j \cdot (\theta2 + \theta00)\} \cdot \quad (50)$$
$$[\omega1 \cdot \exp(j \cdot \pi/2) \cdot \{b2 + b3 \cdot \exp(j \cdot \Delta\theta3)\} +$$
$$\gamma \cdot V \cdot \exp(j \cdot \Delta\theta01) \cdot \{b2 - b3 \cdot \exp(j \cdot \Delta\theta3)\}]$$

In this case, if the distance d1 from the plane PLN, which is perpendicular to the measuring tube axis PAX and includes the electrodes 2a and 2b, to the first exciting coil 3a is almost equal to the distance d2 from the plane PLN to the second exciting coil 3b, (d1≈d2), b2≈b3 and Δθ3≈0. In this case, equations (48), (49), and (50) are rewritten as follows:

$$E20 \approx rk \cdot \exp\{j \cdot (\theta2 + \theta00)\} \cdot \{2 \cdot b2 \cdot \gamma \cdot V \cdot \exp(j \cdot \Delta\theta01)\} \quad (51)$$

$$E2\pi0 \approx rk \cdot \exp\{j \cdot (\theta2 + \theta00)\} \cdot \{2 \cdot b2 \cdot \omega0 \cdot \exp(j \cdot \pi/2)\} \quad (52)$$

$$E2\pi1 \approx rk \cdot \exp\{j \cdot (\theta2 + \theta00)\} \cdot \{2 \cdot b2 \cdot \omega1 \cdot \exp(j \cdot \pi/2)\} \quad (53)$$

That is, since the inter-electrode electromotive force E20 is almost only the electromotive force based on the v×B component, and the inter-electrode electromotive forces E2p0 and E2p1 are almost only the electromotive forces based on the ∂A/∂t components, computation errors in the extraction of the ∂A/∂t component and the normalization computation of the v×B component can be reduced. This is the point where the technical significance of this embodiment differs from that of the first embodiment. Note, however, that the following logical development is also based on b2≠b3 and Δθ3≠0.

Letting EdA2 be the result obtained by multiplying the difference between inter-electrode electromotive forces E2p0 and E2p1 by ω0/(ω0−ω1), equation (54) holds:

$$EdA2 = (E2\pi0 - E2\pi1) \cdot \omega0/(\omega0 - \omega1) \quad (54)$$
$$= rk \cdot \exp\{j \cdot (\theta2 + \theta00)\} \cdot$$
$$[\omega0 \cdot \exp(j \cdot \pi/2) \cdot \{b2 + b3 \cdot \exp(j \cdot \Delta\theta3)\} +$$
$$\gamma \cdot V \cdot \exp(j \cdot \Delta\theta01) \cdot \{b2 - b3 \cdot \exp(j \cdot \Delta\theta3)\} -$$
$$\omega1 \cdot \exp(j \cdot \pi/2) \cdot \{b2 + b3 \cdot \exp(j \cdot \Delta\theta3)\} -$$
$$\gamma \cdot V \cdot \exp(j \cdot \Delta\theta01) -$$
$$\{b2 - b3 \cdot \exp(j \cdot \Delta\theta3)\}] \cdot \omega0/(\omega0 - \omega1)$$
$$= rk \cdot \exp\{j \cdot (\theta2 + \theta00)\} \cdot \omega0 \cdot \exp(j \cdot \pi/2) \cdot$$
$$\{b2 + b3 \cdot \exp(j \cdot \Delta\theta3)\}$$

Figure 9:
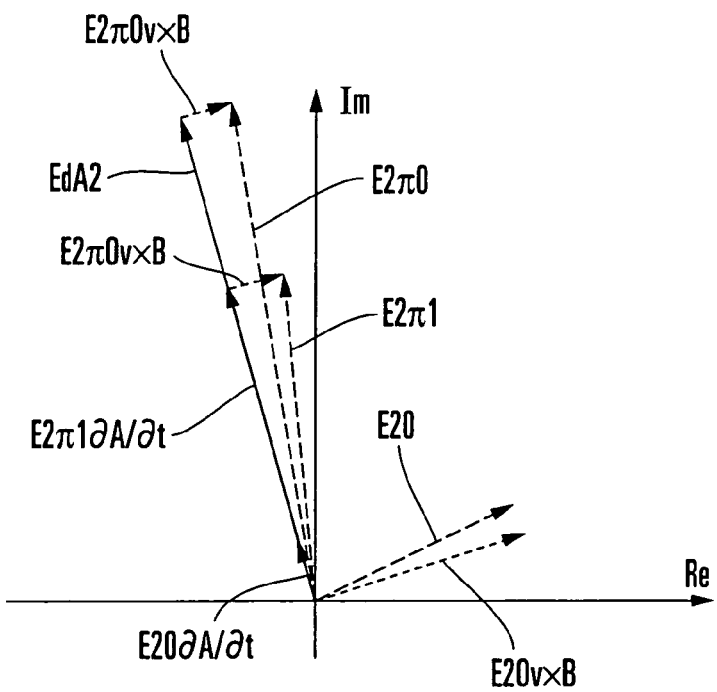
FIG. 9 is a view expressing inter-electrode electromotive forces and an electromotive force difference in the form of complex vectors in the second embodiment of the present invention.

The electromotive force difference EdA2 is irrelevant to the magnitude V of the flow velocity, and hence is only the component generated by ∂A/∂t. The electromotive force difference EdA2 is used to normalize a coefficient (span) by which the magnitude V of the flow velocity of the v×B component in the inter-electrode electromotive force E20 (resultant vector Va+Vb) is multiplied. FIG. 9 is a view expressing the inter-electrode electromotive forces E20, E2p0, and E2p1 and the electromotive force difference EdA2 described above in the form of complex vectors. Referring to FIG. 9, reference symbol E20v×B denotes a v×B component rk·exp{j·(θ2+θ00)}·γ·V·exp(j·Δθ01)·{b2+b3·exp(j·Δθ3)} of the inter-electrode electromotive force E20; E2p0v×B, a v×B component rk·exp{j·(θ2+θ00)}·γV·exp(j·Δθ01)·{b2−b3·exp(j·Δθ3)} of the inter-electrode electromotive forces E2p0 and E2p1; E20∂A/∂t, a ∂A/∂t component rk·exp{j·(θ2+θ00)}·[ω1·exp(j·p/2)·{b2−b3·exp(j·Δθ3)}] of the inter-electrode electromotive force E20; and E2p1∂A/∂t, a ∂A/∂t component rk·exp{j·(θ2+θ00)}·[ω1·exp(j·p/2)·{b2+b3·exp(j·Δθ3)}] of the inter-electrode electromotive force E2p1. To be precise, the electromotive force difference EdA2 is the value obtained by multiplying the electromotive force difference between the inter-electrode electromotive forces E2p0 and E2p1 by ω0/(ω0−ω1). However, the reason why this electromotive force difference is multiplied by ω0/(ω0−ω1) is to facilitate the development of an equation.

Letting En2 be the result obtained by normalizing the inter-electrode electromotive force E20 given by equation (48) with the electromotive force difference EdA2 given by equation (54) and multiplying the inter-electrode electromotive force by ω0, the normalized electromotive force En2 is given by equation (55):

$$En2 = (E20/EdA2) \cdot \omega0 \quad (55)$$
$$= rk \cdot \exp\{j \cdot (\theta2 + \theta00)\} \cdot$$
$$[\omega0 \cdot \exp(j \cdot \pi/2) \cdot \{b2 - b3 \cdot \exp(j \cdot \Delta\theta3)\} +$$
$$\gamma \cdot V \cdot \exp(j \cdot \Delta\theta01) \cdot \{b2 + b3 \cdot \exp(j \cdot \Delta\theta3)\}]/$$
$$[rk \cdot \exp\{j \cdot (\theta2 + \theta00)\} \cdot \omega0 \cdot \exp(j \cdot \pi/2) \cdot$$
$$\{b2 + b3 \cdot \exp(j \cdot \Delta\theta3)\}] \cdot \omega0$$
$$= \omega0 \cdot \{b2 - b3 \cdot \exp(j \cdot \Delta\theta3)\}/\{b2 + b3 \cdot \exp(j \cdot \Delta\theta3)\} +$$
$$[\gamma \cdot \exp\{j \cdot (-\pi/2 + \Delta\theta01)\}] \cdot V$$

The second term of the right side of equation (55) is the term obtained by normalizing the component generated by v×B with the component generated by ∂A/∂t. FIG. 10 is a view expressing the manner of the above normalization processing in the form of complex vectors. Referring to FIG. 10, reference symbol E20v×B denotes a v×B component of the inter-electrode electromotive force E20; and n(v×B), a normalized v×B component $[\gamma \cdot \exp\{j \cdot (-p/2 + \Delta\theta 01)\}] \cdot V$. The reason why the result obtained by normalizing the inter-electrode electromotive force E20 with the electromotive force difference EdA2 is multiplied by $\omega 0$ is to erase the exciting angular frequency $\omega 0$ from the second term of the right side associated with the magnitude V of the flow velocity. According to equation (55), the complex coefficient by which the magnitude V of the flow velocity is multiplied has the magnitude of $\gamma$ and the angle of $-p/2 + \Delta\theta 01$ with respect to the real axis. The coefficient $\gamma$ and the angle $\Delta\theta 01$ are constants which can be obtained in advance by calibration and the like, and the second term of the right side of equation (55) remains constant unless the flow velocity of the fluid to be measured changes.

Normalizing the v×B component by using the $\partial A/\partial t$ component makes it possible to implement span correction of automatically correcting an error due to a magnetic field shift or phase change. Assume that the distance d1 from the plane PLN including the electrodes 2a and 2b to the first exciting coil 3a is almost equal to the distance d2 from the plane PLN to the second exciting coil 3b. In this case, if b2≈b3 and $\Delta\theta 3 \approx 0$, the magnitude V of the flow velocity is expressed as follows according to equation (55):

$$V = |En2/[\gamma \cdot \exp\{j \cdot (-\pi/2 + \Delta\theta 01)\}]| \quad (56)$$
$$= |En2|/\gamma$$

Table 2 shows the correspondence relationship between the constants and variables used in the basic principle described above and the constants and variables in this embodiment. As is obvious from Table 2, this embodiment is an example of specifically implementing the basic principle described above.

TABLE 2

Correspondence Relationship between Basic Principle and Second Embodiment

| Constants and Variables in Basic Principle | Constants and Variables in Second Embodiment |
|---|---|
| $r\omega$ | 1 |
| $rv$ | $\gamma$ |
| $\theta\omega$ | $\pi/2$ |
| $\theta v$ | $\Delta\theta 01$ |
| C | $rk \cdot \exp\{j(\theta 2 + \theta 00)\} \cdot \{b2 + b3 \cdot \exp(j \cdot \Delta\theta 3)\}$ |

A specific arrangement of the electromagnetic flowmeter of this embodiment and its operation will be described next. FIG. 11 is a block diagram showing the arrangement of the electromagnetic flowmeter according to this embodiment. The same reference numerals as in FIG. 6 denote the same components in FIG. 11. The electromagnetic flowmeter according to this embodiment includes the measuring tube 1, the electrodes 2a and 2b, the first and second exciting coils 3a and 3b, a power supply unit 4a which supplies exciting currents to the first and second exciting coils 3a and 3b while switching the phase difference between the exciting currents supplied to the first and second exciting coils 3a and 3b and the exciting frequencies thereof, a signal conversion unit 5a which obtains the amplitudes and phases of resultant electromotive forces in three excitation states, and extracts the electromotive force difference between the resultant electromotive force in the second excitation state and the resultant electromotive force in the third excitation state as a $\partial A/\partial t$ component on the basis of the amplitudes and phases of the resultant electromotive forces, and a flow rate output unit 6a which removes a variation factor for a span contained in the v×B component in the resultant electromotive force in the first excitation state on the basis of the extracted $\partial A/\partial t$ component, and calculates the flow rate of the fluid to be measured from the result obtained by removing the variation factor. The first and second exciting coils 3a and 3b and the power supply unit 4a constitute an exciting unit which applies a time-changing magnetic field asymmetric to the plane PLN to the fluid to be measured.

Assume that in this embodiment, as described above, the distance d1 from the plane PLN to the first exciting coil 3a is almost equal to the distance d2 from the plane PLN to the second exciting coil 3b.

The power supply unit 4a repeats, in a T-sec cycle, the operation of continuing the first excitation state for T0 sec in which an exciting current with an angular frequency $\omega 0$ is supplied to the exciting coil 3a and at the same time the second exciting current with a phase difference $\Delta\theta 3$ with respect to the first exciting current and the angular frequency $\omega 0$ to the second exciting coil 3b, continuing the second excitation state for T1 sec in which the phase difference between the first and second exciting currents in the first excitation state has been changed to $\Delta\theta 3 + p$, and continuing the third excitation state for T2 sec wherein the angular frequency of the first and second exciting currents in the second excitation state has been changed to $\omega 1$. That is, $T = T0 + T1 + T2$.

Figure 12:
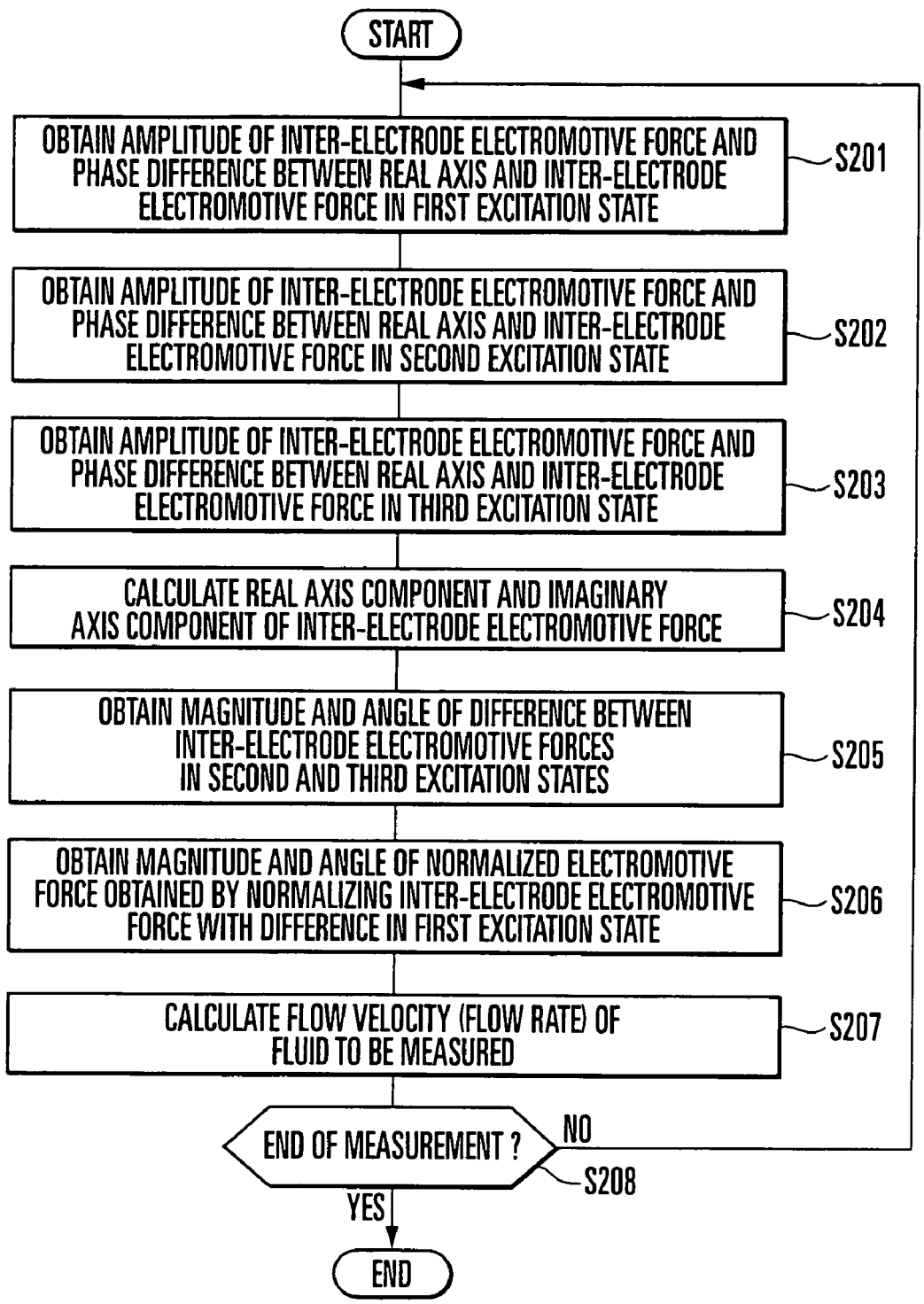
FIG. 12 is a flowchart showing the operations of a signal conversion unit and flow rate output unit in the second embodiment of the present invention.

FIG. 12 is a flowchart showing the operations of the signal conversion unit 5a and flow rate output unit 6a. First of all, the signal conversion unit 5a causes a phase detector (not shown) to obtain an amplitude r20 of the electromotive force E20 between the electrodes 2a and 2b in the first excitation state wherein the first exciting current with the angular frequency $\omega 0$ is supplied to the first exciting coil 3a, and the second exciting current with the phase difference $\Delta\theta 3$ with respect to the first exciting current and the angular frequency $\omega 0$ is supplied to the second exciting coil 3b, and obtain a phase difference $\phi 20$ between the real axis and the inter-electrode electromotive force E20 (step S201 in FIG. 12).

Subsequently, the signal conversion unit 5a causes the phase detector to obtain an amplitude r2p0 of the electromotive force E2p0 between the electrodes 2a and 2b in the second excitation state wherein the phase difference between the first and second exciting currents in the first excitation state has been changed to $\Delta\theta 3 + p$, and obtain a phase difference $\phi 2p0$ between the real axis and the inter-electrode electromotive force E2p0 (step S202).

In addition, the signal conversion unit 5a causes the phase detector to obtain an amplitude r2p1 of the electromotive force E2p1 between the electrodes 2a and 2b in the third excitation state wherein the angular frequency of the first and second exciting currents in the second excitation state has been changed $\omega 1$, and obtain a phase difference $\phi 2p1$ between the real axis and the inter-electrode electromotive force E2p1 (step S203).

The signal conversion unit 5a then calculates a real axis component E20x and imaginary axis component E20y of the inter-electrode electromotive force E20, a real axis component E2p0x and imaginary axis component E2p0y of the inter-electrode electromotive force E2p0, and a real axis component E2p1x and imaginary axis component E2p1y of the inter-electrode electromotive force E2p1 according to the following equations (step S204):

$$E20x = r20 \cdot \cos(\phi 20) \tag{57}$$

$$E20y = r20 \cdot \sin(\phi 20) \tag{58}$$

$$E2\pi 0x = r2\pi 0 \cdot \cos(\phi 2\pi 0) \tag{59}$$

$$E2\pi 0y = r2\pi 0 \cdot \sin(\phi 2\pi 0) \tag{60}$$

$$E2\pi 1x = r2\pi 1 \cdot \cos(\phi 2\pi 1) \tag{61}$$

$$E2\pi 1y = r2\pi 1 \cdot \sin(\phi 2\pi 1) \tag{62}$$

After the calculation of equations (57) to (62), the signal conversion unit $5a$ obtains the magnitude and angle of the electromotive force difference EdA2 between the inter-electrode electromotive forces E2p0 and E2p1 (step S205). The processing in step S205 corresponds to the processing of obtaining a $\partial A/\partial t$ component and a v×B component, and is equivalent to the calculation of equation (54). The signal conversion unit $5a$ calculates a magnitude |EdA2| of the electromotive force difference EdA2 between the inter-electrode electromotive forces E2p0 and E2p1 according to the following equation:

$$|EdA2| = \{(E2\pi 0x - E2\pi 1x)^2 + (E2\pi 0y - E2\pi 1y)^2\}^{1/2} \cdot \omega 0/(\omega 0 - \omega 1) \tag{63}$$

The signal conversion unit $5a$ then calculates an angle ∠EdA2 of the electromotive force difference EdA2 with respect to the real axis according to the following equation:

$$\angle EdA2 = \tan^{-1}\{(E2\pi 0y - E2\pi 1y)/(E2\pi 0x - E2\pi 1x)\} \tag{64}$$

With the above operation, the processing in step S205 is complete.

The flow rate output unit $6a$ then obtains the magnitude and angle of the normalized electromotive force En2 obtained by normalizing the inter-electrode electromotive force E20 with the electromotive force difference EdA2 (step S206). The processing in step S206 is equivalent to the calculation of equation (55). The flow rate output unit $6a$ calculates a magnitude |En2| of the normalized electromotive force En2 according to the following equation:

$$|En2| = (r20/|EdA2|) \cdot \omega 0 \tag{65}$$

The flow rate output unit $6a$ also calculates an angle ∠En2 of the normalized electromotive force En2 with respect to the real axis according to the following equation:

$$\angle En2 = \phi 20 - \angle EdA2 \tag{66}$$

With this operation, the processing in step S206 is complete. Note that ∠En2 is not directly used in the next step of obtaining a flow velocity (flow rate). However, this angle is used to perform measurement with higher accuracy by comparing the angle with an angle obtained at the time of calibration and is not directly associated with the essential operation of span correction, and hence a description thereof will be omitted.

The flow rate output unit $6a$ then calculates the magnitude V of the flow velocity of the fluid to be measured according to equation (56) (step S207).

The signal conversion unit $5a$ and the flow rate output unit $6a$ perform the processing in steps S201 to S207 described above in a cycle T until, for example, the end of the measurement is designated by the operator (YES in step S208). Note that the processing in steps S203 to S207 is performed in the third excitation state for a duration of T2 sec.

As described above, this embodiment is configured to extract the electromotive force difference EdA2 (the vector Va of the $\partial A/\partial t$ component) from the inter-electrode electromotive forces E2p0 and E2p1 in the second and third excitation states with different exciting frequencies and normalize a span by which the magnitude V of the flow velocity of the v×B component in the inter-electrode electromotive force E20 (resultant vector Va+Vb) in the first excitation state is multiplied by using the electromotive force difference EdA2, thereby erasing the span variation element. Therefore, the embodiment can automatically perform accurate span correction and can execute accurate flow rate measurement.

In this embodiment, adjusting the phase difference between the magnetic field B2 generated from the first exciting coil $3a$ and the magnetic field B3 generated from the second exciting coil $3b$ allows the inter-electrode electromotive force E20 in the first excitation to be an almost only electromotive force based on a v×B component, and also allows the inter-electrode electromotive forces E2p0 and E2p1 in the second and third excitation states to be almost only electromotive forces based on $\partial A/\partial t$ components. With this processing, this embodiment can extract a v×B component and a $\partial A/\partial t$ component more effectively, and can reduce computation errors more than the first embodiment.

Note that in this embodiment, the phase difference between the magnetic fields B2 and B3 in the first excitation state is $\Delta\theta 3 \approx 0$, and the phase difference between the magnetic fields B2 and B3 in the second and third excitation states is $\Delta\theta 3 + p$. However, the present invention is not limited to this. Note, however, that since the v×B component preferably dominates the inter-electrode electromotive force E20 in the first excitation state, and the $\partial A/\partial t$ components preferably dominates the inter-electrode electromotive forces E2p0 and E2p1 in the second and third excitation states, the phase difference $\Delta\theta 3$ between the magnetic fields B2 and B3 in the first excitation state preferably satisfies $0 = \Delta\theta 3 < p$.

Third Embodiment

The third embodiment of the present invention will be described next. This embodiment is the same as the first embodiment except that one pair of electrodes are added to the electromagnetic flowmeter, and uses the first extraction method as a method of extracting a vector Va of a $\partial A/\partial t$ component and the second correction method as a span correction method. That is, the electromagnetic flowmeter of this embodiment includes one exciting coil and two pairs of electrodes. If the second electrodes to be newly added are placed on the same side as the existing first electrodes, the resultant arrangement is a redundant arrangement of the first embodiment. Therefore, the second electrodes need to be placed on a side different from that of the first electrodes through the exciting coil.

Figure 13:
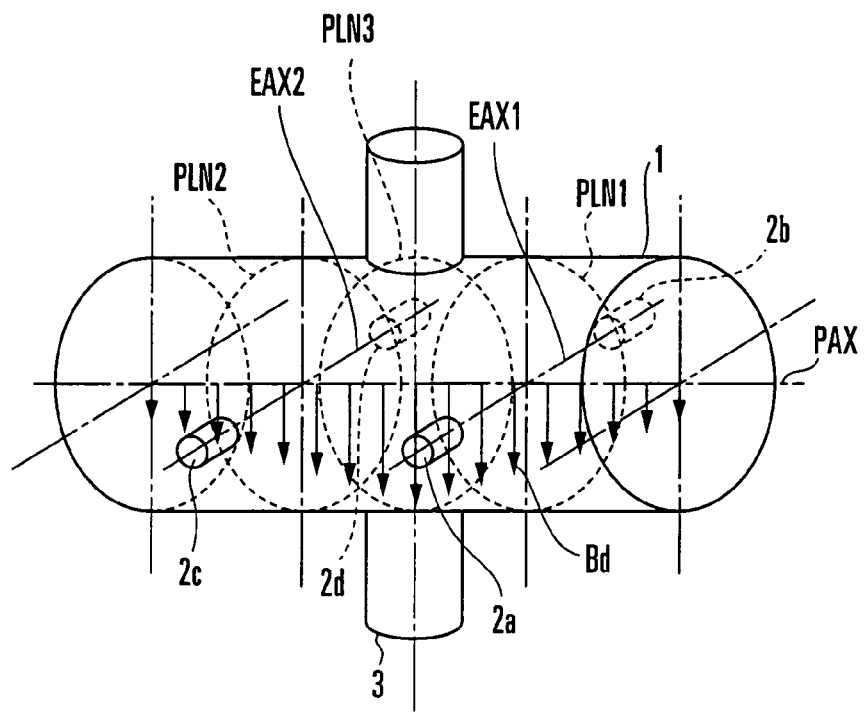
FIG. 13 is a block diagram for explaining the principle of an electromagnetic flowmeter according to the third embodiment of the present invention.

FIG. 13 is a block diagram for explaining the principle of the electromagnetic flowmeter according to this embodiment. This electromagnetic flowmeter includes a measuring tube 1, first electrodes 2a and 2b and second electrodes 2c and 2d which are arranged in the measuring tube 1 to be perpendicular to both a magnetic field applied to a fluid to be measured and a measuring tube axis PAX and face each other so as to become into contact with the fluid to be measured, and detect the electromotive force generated by the magnetic field and the flow of the fluid to be measured, and an exciting coil 3 which applies, to the fluid to be measured, a time-changing magnetic field which is asymmetric on the front and rear sides of the measuring tube 1 which are bordered on a plane PLN1 and a time-changing magnetic field which is asymmetric on the front and rear sides of the measuring tube 1 which are bordered on a plane PLN2, with a plane which is perpendicular to the measuring tube axis PAX and includes the first electrodes 2a and 2b serving as the plane PLN1 and a plane which is perpendicular to the measuring tube axis PAX and includes the second electrodes 2c and 2d serving as the plane PLN2.

The first electrodes 2a and 2b are placed at a position spaced apart from a plane PLN3 which includes the axis of the exciting coil 3 and is perpendicular to the direction of the measuring tube axis PAX by an offset distance d3 to, for example, the upstream side. The second electrodes 2c and 2d are placed at a position spaced apart from the plane PLN3 by an offset distance d4 to, for example, the downstream side so as to face the first electrodes 2a and 2b through a plane PLN.

Assume that a magnetic field component (magnetic flux density) B4, of a magnetic field Bb generated from the exciting coil 3, which is orthogonal to both an electrode axis EAX1 connecting the electrodes 2a and 2b and the measuring tube axis PAX on the electrode axis EAX1, and a magnetic field component (magnetic flux density) B5, of the magnetic field Bd generated from the exciting coil 3, which is orthogonal to both an electrode axis EAX2 connecting the electrodes 2c and 2d and the measuring tube axis PAX on the electrode axis EAX2 are given by $$B4 = b4 \cdot \cos(\omega 0 \cdot t - \theta 4) \tag{67}$$

$$B5 = b5 \cdot \cos(\omega 0 \cdot t - \theta 5) \tag{68}$$

Note, however, that since the magnetic fields B4 and B5 are generated from one exciting coil 3, b4 and b5 and θ4 and θ5 are associated with each other and are not independent variables. In equations (67) and (68), reference symbols b4 and b5 denote the amplitudes of the magnetic flux densities B4 and B5; ω0, an angular frequency; and θ and θ5, the phase differences (phase delays) between the magnetic flux densities B4 and B5 and ω0·t. The magnetic flux densities B4 and B5 will be respectively referred to as the magnetic fields B4 and B5 hereinafter.

Figure 14:
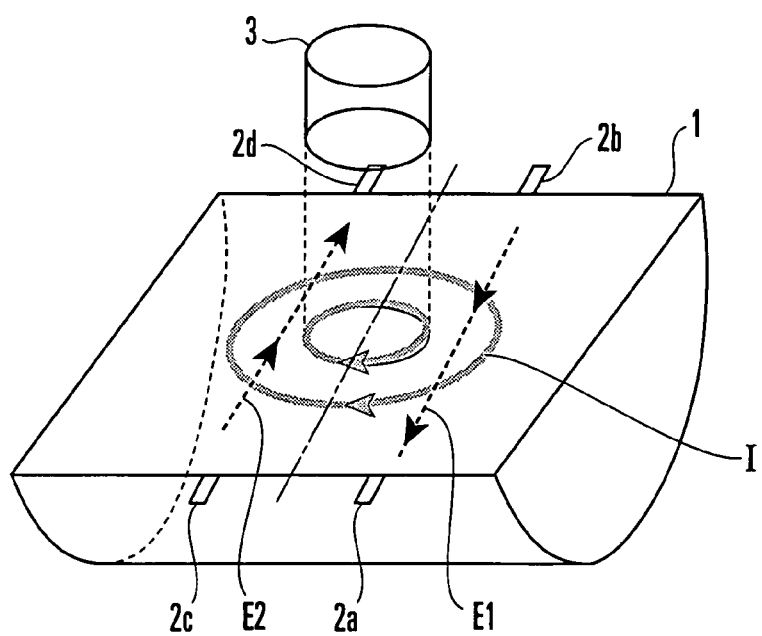
FIG. 14 is a showing eddy currents and inter-electrode electromotive forces when the flow rate of a fluid to-be measured is 0 in the third embodiment of the present invention.

If the flow velocity of the fluid to be measured is 0, a generated eddy current is only a component originating from a change in magnetic field. An eddy current I due to a change in the magnetic field Bd is directed as shown in FIG. 14. Therefore, an electromotive force E1 which is generated between the electrodes 2a and 2b by a change in the magnetic field Bd and is irrelevant to the flow velocity and an electromotive force E2 which is generated between the electrodes 2c and 2d by a change in the magnetic field Bd and is irrelevant to the flow velocity are directed opposite to each other within a plane including the electrode axis EAX1 and the measuring tube axis PAX, as shown in FIG. 14.

Figure 15:
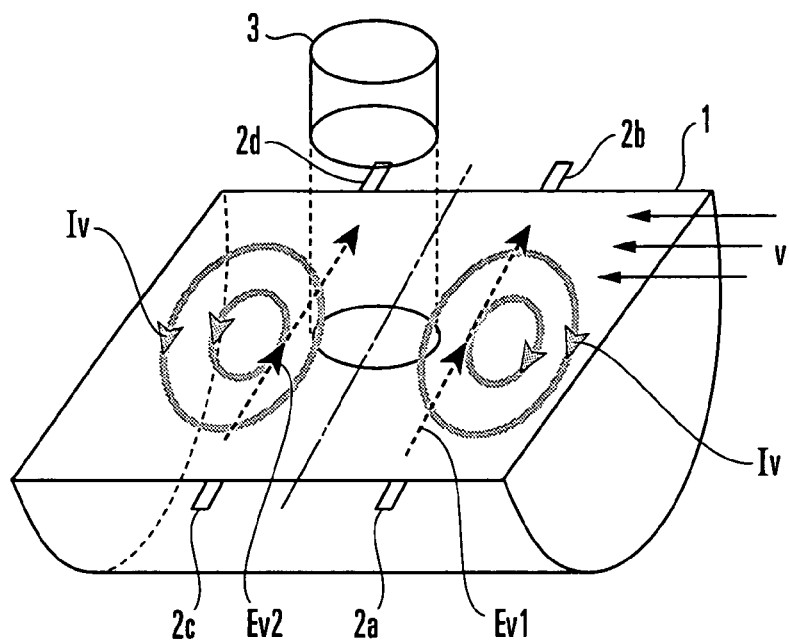
FIG. 15 is a view showing eddy currents and inter-electrode electromotive forces when the flow rate of a fluid to be measured is 0 in the third embodiment of the present invention.

If the flow velocity of the fluid to be measured is V (V≠0), a component v×Bd originating from a flow velocity vector v of the fluid to be measured is generated in the generated eddy current in addition to the eddy current I generated when the flow velocity is 0. For this reason, an eddy current Iv originating from the flow velocity vector v and the magnetic field Bd is directed as shown in FIG. 15. Consequently, an electromotive force Ev1 generated between the electrodes 2a and 2b by the flow velocity vector v and the magnetic field Bd and an electromotive force Ev2 generated between the electrodes 2c and 2d by the flow velocity vector v and the magnetic field Bd are directed in the same direction.

Considering the directions of the inter-electrode electromotive forces described with reference to FIGS. 14 and 15, a first electromotive force E31 between the electrodes 2a and 2b obtained by combining the inter-electrode electromotive force originating from a temporal change in magnetic field and the inter-electrode electromotive force originating from the flow velocity of the fluid to be measured is expressed by the following equation similar to equation (20):

$$E31 = \tag{69}$$
$$rk \cdot \omega 0 \cdot b4 \cdot \exp\{j \cdot (\pi/2 + \theta 4 + \theta 00)\} + rkv \cdot b4 \cdot \exp\{j \cdot (\theta 4 + \theta 01)\}$$

A second electromotive force E33 between the electrodes 2c and 2d obtained by combining the inter-electrode electromotive force originating from a temporal change in magnetic field and the inter-electrode electromotive force originating from the flow velocity of the fluid to be measured is expressed by the following equation based on equation (20):

$$E32 = \tag{70}$$
$$rk \cdot \omega 0 \cdot b5 \cdot \exp\{j \cdot (-\pi/2 + \theta 5 + \theta 00)\} + rkv \cdot b5 \cdot \exp\{j \cdot (\theta 5 + \theta 01)\}$$

As is obvious from equation (69), the first inter-electrode electromotive force E31 is written by two complex vectors rk·ω0·b4·exp{j·(p/2+θ4+θ00)} and rkv·b4·exp{j·(θ4+θ01)}. The length of the resultant vector obtained by combining the two complex vectors represents the amplitude of the output (inter-electrode electromotive force E31), and an angle φ of the resultant vector represents the phase difference (phase lag) of the inter-electrode electromotive force E31 with respect to a phase ω0·t of the input (exciting current).

Likewise, according to equation (70), the second inter-electrode electromotive force E32 is written by two complex vectors rk·ω0·b5·exp{j·(-p/2+θ5+θ00)} and rkv·b5·exp{j·(θ5+θ01)}. The length of the resultant vector obtained by combining the two complex vectors represents the amplitude of the output (inter-electrode electromotive force E32), and the angle φ of the resultant vector represents the phase difference (phase lag) of the inter-electrode electromotive force E32 with respect to the phase ω0·t of the input (exciting current).

According to equations (69) and (70), a sum Es30 of the first inter-electrode electromotive force E31 and the second inter-electrode electromotive force E32 and a difference Ed30 between them are given by $$\begin{aligned}Es30 &= E31 + E32 \\ &= rk \cdot \omega 0 \cdot b4 \cdot \exp\{j(\pi/2 + \theta 4 + \theta 00)\} + \\ &\quad rkv \cdot b4 \cdot \exp\{j \cdot (\theta 4 + \theta 01)\} \\ &\quad rk \cdot \omega 0 \cdot b5 \cdot \exp\{j \cdot (-\pi/2 + \theta 5 + \theta 00)\} \\ &\quad rkv \cdot b5 \cdot \exp\{j \cdot (\theta 5 + \theta 01)\}\end{aligned} \tag{71}$$

$$\begin{aligned}Ed30 &= E31 - E32 \\ &= rk \cdot \omega 0 \cdot b4 \cdot \exp\{j \cdot (\pi/2 + \theta 4 + \theta 00)\} + \\ &\quad rkv \cdot b4 \cdot \exp\{j \cdot (\theta 4 + \theta 01)\} - \\ &\quad rk \cdot \omega 0 \cdot b5 \cdot \exp\{j \cdot (-\pi/2 + \theta 5 + \theta 00)\} - \\ &\quad rkv \cdot b5 \cdot \exp\{j \cdot (\theta 5 + \theta 01)\}\end{aligned} \tag{72}$$

Assume that the first excitation state is a state wherein θ5=θ4+Δθ5 represents the relationship between a phase lag θ4 of the magnetic field B4 with respect to ω0·t and a phase lag θ5 of the magnetic field B5 with respect to ω0·t, and θ01=θ00+Δθ01 represents the relationship between an angle θ00 of a vector Va with respect to the imaginary axis and an angle θ01 of a vector Vb with respect to the real axis. In this case, when equation (18) is substituted into equations (71)

and (72), the electromotive force sum Es30 and the electromotive force difference Ed30 in the first excitation state are given by $$Es30 = rk \cdot \omega 0 \cdot b4 \cdot \exp\{j \cdot (\pi/2 + \theta 4 + \theta 00)\} + \qquad (73)$$
$$\gamma \cdot rk \cdot V \cdot b4 \cdot \exp\{j \cdot (\theta 4 + \theta 00 + \Delta\theta 01)\} +$$
$$rk \cdot \omega 0 \cdot b5 \cdot \exp\{j \cdot (-\pi/2 + \theta 4 + \Delta\theta 5 + \theta 00)\} +$$
$$\gamma \cdot rk \cdot V \cdot b5 \cdot \exp\{j \cdot (\theta 4 + \Delta\theta 5 + \theta 00 + \Delta\theta 01)\}$$
$$= rk \cdot \exp\{j \cdot (\theta 4 + \theta 00)\} \cdot$$
$$[\omega 0 \cdot \exp(j \cdot \pi/2) \cdot \{b4 - b5 \cdot \exp(j \cdot \Delta\theta 5)\} +$$
$$\gamma \cdot V \cdot \exp(j \cdot \Delta\theta 01) \cdot \{b4 + b5 \cdot \exp(j \cdot \Delta\theta 5)\}$$

$$Ed30 = rk \cdot \omega 0 \cdot b4 \cdot \exp\{j \cdot (\pi/2 + \theta 4 + \theta 00)\} + \qquad (74)$$
$$\gamma \cdot rk \cdot V \cdot b4 \cdot \exp\{j \cdot (\theta 4 + \theta 00 + \Delta\theta 01)\} -$$
$$rk \cdot \omega 0 \cdot b5 \cdot \exp\{j \cdot (-\pi/2 + \theta 4 + \Delta\theta 5 + \theta 00)\} -$$
$$\gamma \cdot rk \cdot V \cdot b5 \cdot \exp\{j \cdot (\theta 4 + \Delta\theta 5 + \theta 00 + \Delta\theta 01)\}$$
$$= rk \cdot \exp\{j \cdot (\theta 4 + \theta 00)\} \cdot$$
$$[\omega 0 \cdot \exp(j \cdot \pi/2) \cdot \{b4 + b5 \cdot \exp(j \cdot \Delta\theta 5)\} + \gamma \cdot V \cdot$$
$$\exp(j \cdot \Delta\theta 01) \cdot \{b4 - b5 \cdot \exp(j \cdot \Delta\theta 5)\}]$$

Assume that the second excitation state is a state wherein the exciting angular frequency in the first excitation state has changed from $\omega 0$ to $\omega 1$. In this case, letting Ed31 be an electromotive force difference in the second excitation state, the electromotive force difference Ed31 is given by the following equation according to equation (74):

$$Ed31 = rk \cdot \exp\{j \cdot (\theta 4 + \theta 00)\} \cdot \qquad (75)$$
$$[\omega 1 \cdot \exp(j \cdot \pi/2) \cdot \{b4 + b5 \cdot \exp(j \cdot \Delta\theta 5)\} +$$
$$\gamma \cdot V \cdot \exp(j \cdot \Delta\theta 01) \cdot \{b4 - b5 \cdot \exp(j \cdot \Delta\theta 5)\}]$$

In this case, if the distance d3 from the plane PLN3 including the axis of the exciting coil 3 to the electrode axis EAX1 connecting the electrodes 2a and 2b is almost equal to the distance d4 from the plane PLN3 to the electrode axis EAX2 connecting the electrodes 2c and 2d, (d3≈d4), b4≈b5 and Δθ5≈0. In this case, equations (73), (74), and (75) are transformed as follows:

$$Es30 \approx rk \cdot \exp\{j \cdot (\theta 4 + \theta 00)\} \cdot \{2 \cdot b4 \cdot \gamma \cdot V \cdot \exp(j \cdot \Delta\theta 01)\} \qquad (76)$$

$$Ed30 \approx rk \cdot \exp\{j \cdot (\theta 4 + \theta 00)\} \cdot \{2 \cdot b4 \cdot \omega 0 \cdot \exp(j \cdot \pi/2)\} \qquad (77)$$

$$Ed31 \approx rk \cdot \exp\{j \cdot (\theta 4 + \theta 00)\} \cdot \{2 \cdot b4 \cdot \omega 1 \cdot \exp(j \cdot \pi/2)\} \qquad (78)$$

That is, since the inter-electrode electromotive force Es30 is almost only the electromotive force based on the v×B component, and the inter-electrode electromotive forces Ed30 and Ed31 are almost only the electromotive forces based on the ∂A/∂t components, computation errors in the extraction of the ∂A/∂t component and the normalization computation of the v×B component can be reduced. This is the point where the technical significance of this embodiment differs from that of the first embodiment. Note, however, that the following logical development is also based on b4≠b5 and Δθ5≠0.

Letting EdA3 be the result obtained by multiplying the difference between electromotive forces Ed30 and Ed31 by $\omega 0/(\omega 0 - \omega 1)$, equation (79) holds:

$$EdA3 = (Ed30 - Ed31) \cdot \omega 0 / (\omega 0 - \omega 1) \qquad (79)$$
$$= rk \cdot \exp\{j \cdot (\theta 4 + \theta 00)\} \cdot$$
$$\omega 0 \cdot \exp(j \cdot \pi/2) \cdot \{b4 + b5 \cdot \exp(j \cdot \Delta\theta 5)\}$$

Figure 16:
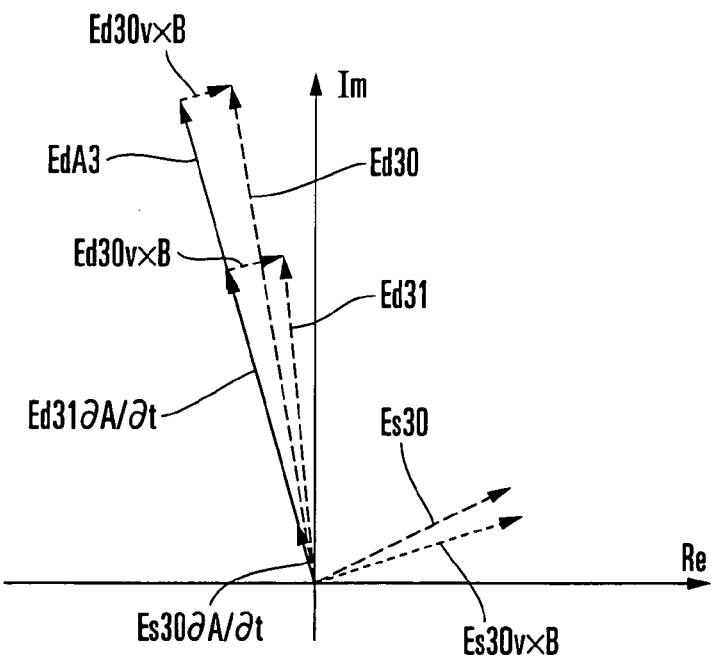
FIG. 16 is a view expressing electromotive force sums, electromotive force differences, and the difference between the electromotive force differences in the form of complex vectors in the third embodiment of the present invention.

The difference EdA3 is irrelevant to the magnitude V of the flow velocity, and hence is only the component generated by ∂A/∂t. The difference EdA3 is used to normalize a coefficient (span) by which the magnitude V of the flow velocity of the electromotive force sum Es30 is multiplied comprising only the component generated by v×B. FIG. 16 is a view expressing the electromotive force sum Es30, the electromotive force differences Ed30 and Ed31, and the difference EdA3 in the form of complex vectors. Referring to FIG. 16, reference symbol Es30v×B denotes a v×B component rk·exp{j·(θ4+θ00)}·γ·V·exp(j·Δθ01)·{b4+b5·exp(j·Δθ5)} of the inter-electrode electromotive force Es30; Ed30v×B, a v×B component rk·exp{j·(θ4+θ00)}·γ·V·exp(j·Δθ01)·{b4−b5·exp(j·Δθ5)} of the electromotive force differences Ed30 and Ed31; Es30∂A/∂t, a ∂A/∂t component rk·exp{j·(θ4+θ00)}·[ω1·exp(j·p/2)·{b4−b5·exp(j·Δθ5)}] of the inter-electrode electromotive force Es30; and Ed31∂A/∂t, a ∂A/∂t component rk·exp{j·(θ4+θ00)}·[ω1·exp(j·p/2)·{b4+b5·exp(j·Δθ5)}] of the electromotive force difference Ed31. To be precise, the difference EdA3 is the value obtained by multiplying the difference between the electromotive force differences Ed30 and Ed31 by $\omega 0/(\omega 0 - \omega 1)$. However, the reason why this difference is multiplied by $\omega 0/(\omega 0 - \omega 1)$ is to facilitate the development of an equation.

Letting En3 be the result obtained by normalizing the electromotive force sum Es30 given by equation (73) with the difference EdA3 given by equation (79) and multiplying the normalization result by $\omega 0$, the normalized electromotive force En3 is given by equation (80):

$$En3 = (Es30/EdA3) \cdot \omega 0 \qquad (80)$$
$$= rk \cdot \exp\{j \cdot (\theta 4 + \theta 00)\} \cdot$$
$$[\omega 0 \cdot \exp(j \cdot \pi/2) \cdot \{b4 - b5 \cdot \exp(j \cdot \Delta\theta 5)\} +$$
$$\gamma \cdot V \cdot \exp(j \cdot \Delta\theta 01) \cdot \{b4 + b5 \cdot \exp(j \cdot \Delta\theta 5)\}] /$$
$$[rk \cdot \exp(j \cdot (\theta 4 + \theta 00)) \cdot \omega 0 \cdot \exp(j \cdot \pi/2) \cdot$$
$$\{b4 + b5 \cdot \exp(j \cdot \Delta\theta 5)\}] \cdot \omega 0$$
$$= \omega 0 \cdot \{b4 - b5 \cdot \exp(j \cdot \Delta\theta 5)\} /$$
$$\{b4 + b5 \cdot \exp(j \cdot \Delta\theta 5)\} +$$
$$[\gamma \cdot \exp\{j \cdot (-\pi/2 + \Delta\theta 01)\}] \cdot V$$

Figure 17:
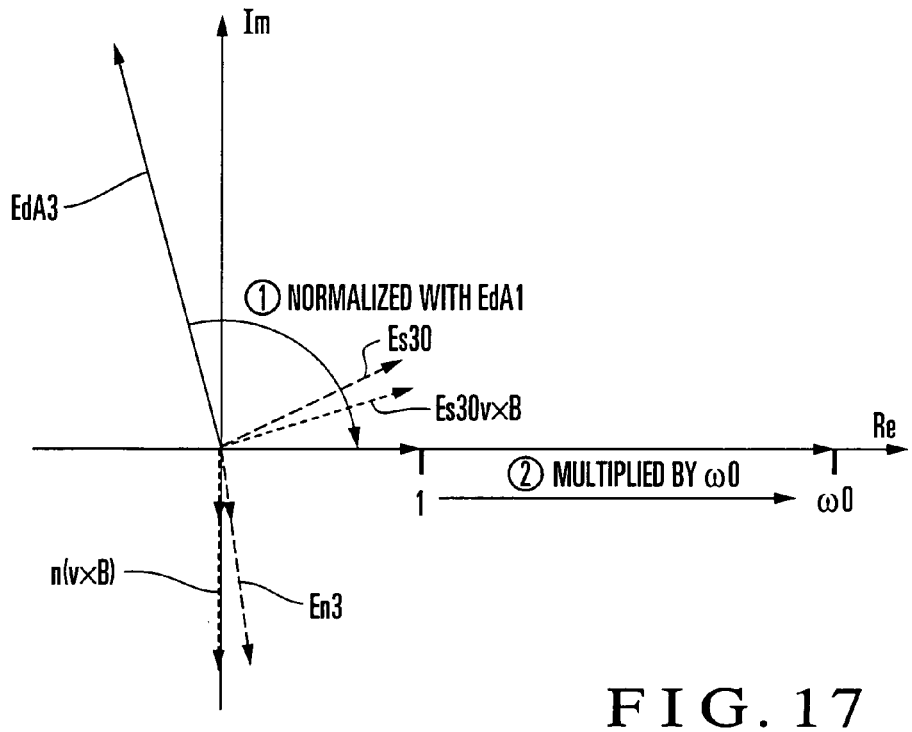
FIG. 17 is a view expressing the manner of normalization processing in the form of complex vectors in the third embodiment of the present invention.

The second term of the right side of equation (80) is the term obtained by normalizing the component generated by v×B with the component generated by ∂A/∂t. FIG. 17 is a view expressing the manner of the above normalization processing in the form of complex vectors. Referring to FIG. 17, reference symbol Es30v×B denotes a v×B component of the inter-electrode electromotive force Es30; and n(v×B), a normalized v×B component [γ·exp{j·(−p/2+Δθ01)})]·V. The reason why the result obtained by normalizing the electromotive force sum Es30 with the difference EdA3 is multiplied by $\omega 0$ is to erase the exciting angular frequency $\omega 0$ from the second term of the right side associated with the magnitude V of the flow velocity. According to equation (80), the complex coefficient by which the magnitude V of the flow velocity is multiplied has the magnitude of γ and the angle of $-p/2+\Delta\theta 01$ with respect to the real axis. The coefficient γ and the angle $\Delta\theta 01$ are constants which can be obtained in advance by calibration and the like, and the second term of the right side of equation (80) remains constant unless the flow velocity of the fluid to be measured changes.

Normalizing the v×B component by using the ∂A/∂t component, therefore, makes it possible to implement span correction of automatically correcting an error due to a magnetic field shift or phase change. Assume that the distance d3 from the plane PLN3 including the axis of the exciting coil 3 to the electrode axis EAX1 connecting the electrodes 2a and 2b is almost equal to the distance d4 from the plane PLN3 to the electrode axis EAX2 connecting the electrodes 2c and 2d. In this case, if b4≈b5 and $\Delta\theta 5\approx 0$, the magnitude V of the flow velocity is expressed as follows according to equation (80):

$$V = |En3/[\gamma \cdot \exp\{j \cdot (-\pi/2 + \Delta\theta 01)\}]| \quad (81)$$
$$= |En3|/\gamma$$

Table 3 shows the correspondence relationship between the constants and variables used in the basic principle described above and the constants and variables in this embodiment. As is obvious from Table 3, this embodiment is an example of specifically implementing the basic principle described above.

TABLE 3

Correspondence Relationship between
Basic Principle and Third Embodiment

| Constants and Variables in Basic Principle | Constants and Variables in Third Embodiment |
|---|---|
| rω | 1 |
| rv | γ |
| θω | π/2 |
| θv | Δθ01 |
| C | rk · exp{j(θ4 + θ00)} · {b4 + b5 · exp(j · Δθ5)} |

Figure 18:
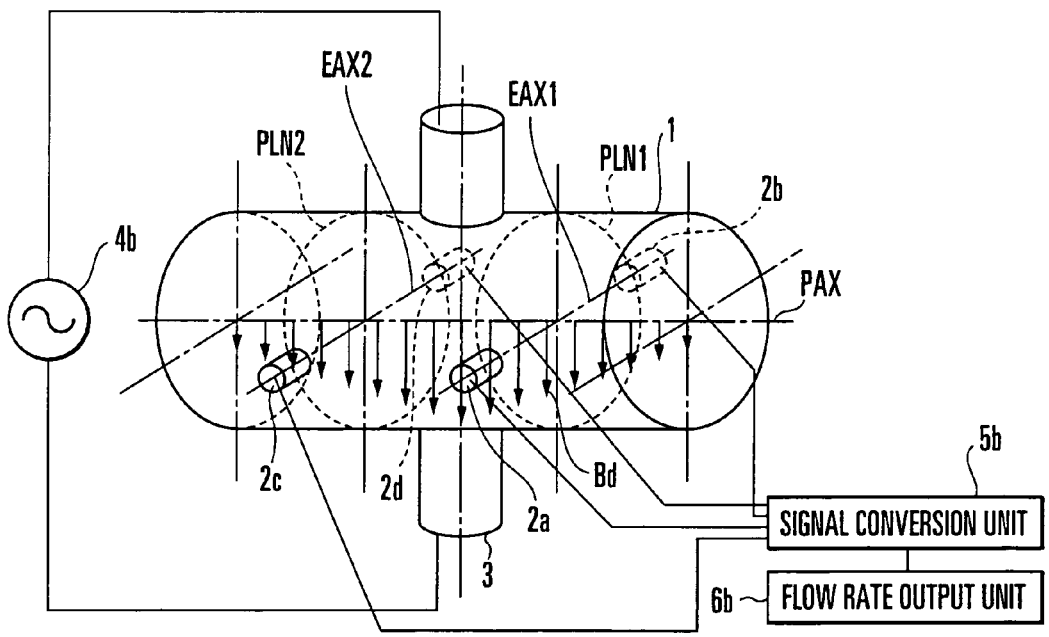
FIG. 18 is a block diagram showing the arrangement of an electromagnetic flowmeter according to the third embodiment of the present invention.

A specific arrangement of the electromagnetic flowmeter of this embodiment and its operation will be described next. FIG. 18 is a block diagram showing the arrangement of the electromagnetic flowmeter according to this embodiment. The same reference numerals as in FIG. 13 denote the same components in FIG. 18. The electromagnetic flowmeter according to this embodiment includes the measuring tube 1, the first electrodes 2a and 2b, the second electrodes 2c and 2d, the exciting coil 3, a power supply unit 4b which supplies exciting currents to the exciting coil 3 while switching exciting frequencies, a signal conversion unit 5b which obtains the amplitudes and phases of the electromotive force differences between the first resultant electromotive forces detected by the first electrodes 2a and 2b and the second resultant electromotive forces detected by the second electrodes 2c and 2d, respectively, in the first and second excitation states with different exciting frequencies, and extracts the difference between the electromotive force difference in the first excitation state and the electromotive force difference in the second excitation state as a ∂A/∂t component on the basis of the amplitudes and phases of the electromotive force differences, and a flow rate output unit 6b which removes a variation factor for a span contained in the v×B component in the electromotive force sum of the first resultant electromotive force and second resultant electromotive force in the first excitation state on the basis of the extracted ∂A/∂t component, and calculates the flow rate of the fluid to be measured from the result obtained by removing the variation factor.

The power supply unit 4b repeats, in a T-sec cycle, the operation of continuing the first excitation state for T0 sec in which an exciting current with an angular frequency ω0 is supplied to the exciting coil 3, and the second excitation state for T1 sec in which an exciting current with the angular frequency ω1 to the exciting coil 3. That is, T=T0+T1.

Figure 19:
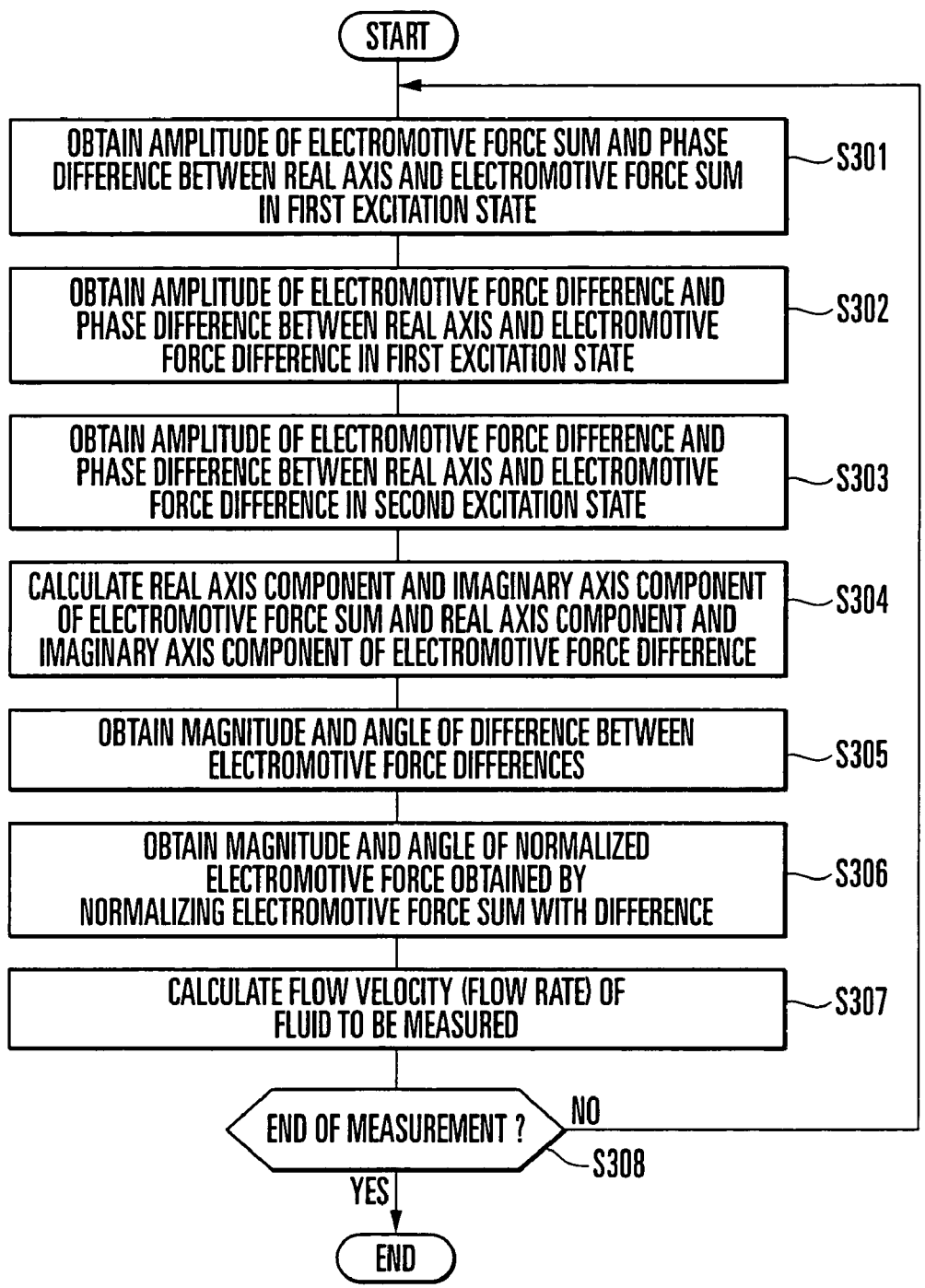
FIG. 19 is a flowchart showing the operations of a signal conversion unit and flow rate output unit in the third embodiment of the present invention.

FIG. 19 is a flowchart showing the operations of the signal conversion unit 5b and flow rate output unit 6b. First of all, the signal conversion unit 5b causes a phase detector (not shown) to obtain an amplitude rs30 of a sum Es30 of the first electromotive force E31 between the electrodes 2a and 2b and the second electromotive force E32 between the electrodes 2c and 2d in the first excitation state wherein the exciting angular frequency is ω0, and obtain a phase difference φs30 between the real axis and the electromotive force sum Es30 (step S301 in FIG. 19).

In addition, the signal conversion unit 5b causes the phase detector to obtain an amplitude rd30 of the difference Ed30 between the first inter-electrode electromotive force E31 and the second inter-electrode electromotive force E32 in the first excitation state, and obtain a phase difference φd30 between the real axis and the electromotive force difference Ed30 (step S302).

Subsequently, the signal conversion unit 5b causes the phase detector to obtain an amplitude rd31 of the difference Ed31 between the first inter-electrode electromotive force E31 and the second inter-electrode electromotive force E32 in the second excitation state wherein the exciting angular frequency is ω1, and also obtain a phase difference φd31 between the real axis and the electromotive force Ed31 (step S303).

The signal conversion unit 5b then calculates a real axis component Es30x and imaginary axis component Es30y of the electromotive force sum Es30, a real axis component Ed30x and imaginary axis component Ed30y of the electromotive force difference Ed30, and a real axis component Ed31x and imaginary axis component Ed31y of the electromotive force difference Ed31 according to the following equations (step S304):

$$Es30x = rs30 \cdot \cos(\phi s30) \quad (82)$$

$$Es30y = rs30 \cdot \sin(\phi s30) \quad (83)$$

$$Ed30x = rd30 \cdot \cos(\phi d30) \quad (84)$$

$$Ed30y = rd30 \cdot \sin(\phi d30) \quad (85)$$

$$Ed31x = rd31 \cdot \cos(\phi d31) \quad (86)$$

$$Ed31y = rd31 \cdot \sin(\phi d31) \quad (87)$$

After the calculation of equations (82) to (87), the signal conversion unit 5b obtains the magnitude and angle of the difference EdA3 between the electromotive force differences Ed30 and Ed31 (step S305). The processing in step S305 corresponds to the processing of obtaining a ∂A/∂t component and a v×B component, and is equivalent to the calculation of equation (79). The signal conversion unit 5b calculates a magnitude |EdA3| of the difference EdA3 between the electromotive force differences Ed30 and Ed31 according to the following equation:

$$|EdA3| = \{(Ed30x - Ed31x)^2 + (Ed30y - Ed31y)^2\}^{1/2} \cdot \omega 0/(\omega 0 - \omega 1) \quad (88)$$

The signal conversion unit 5b then calculates an angle ∠EdA3 of the difference EdA3 with respect to the real axis according to the following equation:

$$\angle EdA3 = \tan^{-1}\{(Ed30y - Ed31y)/(Ed30x - Ed31x)\} \quad (89)$$

With the above operation, the processing in step S305 is complete.

The flow rate output unit 6b then obtains the magnitude and angle of the normalized electromotive force En3 obtained by normalizing the electromotive force sum Es30 with the difference EdA3 (step S306). The processing in step S306 is equivalent to the calculation of equation (80). The flow rate output unit 6b calculates a magnitude |En3| of the normalized electromotive force En3 according to the following equation:

$$|En3| = (rs30/|EdA3|) \cdot \omega 0 \quad (90)$$

The flow rate output unit 6b also calculates an angle ∠En3 of the normalized electromotive force En3 with respect to the real axis according to the following equation:

$$\angle En3 = \phi s30 - \angle EdA3 \quad (91)$$

With this operation, the processing in step S306 is complete. Note that ∠En3 is not directly used in the next step of obtaining a flow velocity (flow rate). However, this angle is used to perform measurement with higher accuracy by comparing the angle with an angle obtained at the time of calibration and is not directly associated with the essential operation of span correction, and hence a description thereof will be omitted.

The flow rate output unit 6b then calculates the magnitude V of the flow velocity of the fluid to be measured according to equation (81) (step S307).

The signal conversion unit 5b and the flow rate output unit 6b perform the processing in steps S301 to S307 described above in a cycle T until, for example, the end of the measurement is designated by the operator (YES in step S308). Note that the processing in steps S303 to S307 is performed in the second excitation state for a duration of T1 sec.

As described above, this embodiment is configured to obtain the electromotive force differences Ed30 and Ed31 between the first electromotive forces and the second electromotive forces in the first and second excitation states with different exciting frequencies, extract the difference EdA3 (the vector Va of the ∂A/∂t component) from the electromotive force differences Ed30 and Ed31, and normalize a span by which the magnitude V of the flow velocity of the v×B component in the electromotive force sum Es30 (resultant vector Va+Vb) of the first and second inter-electrode electromotive forces in the first excitation state is multiplied by using the difference EdA3, thereby erasing the span variation element. Therefore, the embodiment can automatically perform accurate span correction and can execute accurate flow rate measurement.

In this embodiment, adjusting the distance d3 from the plane PLN3 including the axis of the exciting coil 3 to the first electrodes 2a and 2b and the distance d4 from the plane PLN3 to the second electrodes 2c and 2d allows the electromotive force sum Es30 to be an almost only electromotive force based on a v×B component, and also allows the electromotive force differences Ed30 and Ed31 to be almost only electromotive forces based on ∂A/∂t components. With this processing, this embodiment can extract a v×B component and a ∂A/∂t component more effectively, and can reduce computation errors more than the first embodiment.

Note that this embodiment has exemplified the case of extracting the difference EdA3 from the electromotive force difference between the first and second inter-electrode electromotive forces and normalizing the electromotive force sum of the first and second inter-electrode electromotive forces by using the difference EdA3. However, the present invention is not limited to this. The electromotive force sums of the first and second inter-electrode electromotive forces in the first and second excitation states with different exciting frequencies may be obtained, and the difference between these electromotive force sums may be extracted as a ∂A/∂t component. The electromotive force difference between the first and second inter-electrode electromotive forces in the first excitation state may be normalized by using this ∂A/∂t component.

Fourth Embodiment

The fourth embodiment of the present invention will be described next. This embodiment is the same as the first embodiment except that one exciting coil is added to the electromagnetic flowmeter, and uses the second extraction method as a method of extracting a vector Va of a ∂A/∂t component and the second correction method as a span correction method. That is, the arrangement of this embodiment is the same as that of the second embodiment except for the signal processing system of the electromagnetic flowmeter, and hence the principle of this embodiment will be described by using the reference numerals in FIG. 6.

Equation (47) represents an overall inter-electrode electromotive force Eac2 obtained by combining the inter-electrode electromotive force originating from a temporal change in magnetic field and the inter-electrode electromotive force originating from the flow velocity of the fluid to be measured. Assume that the first excitation state is a state wherein θ3=θ2+Δθ3 represents the relationship between a phase lag θ2 of a magnetic field B2 with respect to ω0·t and a phase lag θ3 of a magnetic field B3 with respect to ω0·t, and θ01=θ00+Δθ01 represents the relationship between an angle θ00 of a vector Va with respect to the imaginary axis and an angle θ01 of a vector Vb with respect to the real axis. In this case, letting E20 be the inter-electrode electromotive force Eac2 in the first excitation state, the inter-electrode electromotive force E20 obtained when equation (18) is substituted into equation (47) is given by equation (48).

Assume that the second excitation state is a state wherein the phase difference between the magnetic fields B2 and B3 has changed from that in the first excitation state by a constant value p (θ3=p+θ2+Δθ3), and θ01=θ00+Δθ01. In this case, letting E2p0 be the inter-electrode electromotive force Eac2 in the second excitation state, the inter-electrode electromotive force E2p0 obtained when equation (18) is substituted into equation (47) is given by equation (49).

If the magnetic field B2 generated from a first exciting coil 3a is set to be equal to the magnetic field B3 generated from a second exciting coil 3b in the initial state (at the time of calibration), the difference between the magnetic fields B2 and B3 decreases afterward. As a consequence, the following expression holds:

$$|b2+b3\cdot\exp(j\cdot\Delta\theta 3)| >> |b2-b3\cdot\exp(j\cdot\Delta\theta 3)| \quad (92)$$

In expression (92), |b2+b3·exp(j·Δθ3)| represents the magnitude of a complex vector b2+b3·exp(j·Δθ3), and |b2−b3·exp(j·Δθ3)| represents the magnitude of a complex vector b2−b3·exp(j·Δθ3).

In addition, since ω0>γ·V generally holds, the following condition holds in equation (49) in consideration of the condition represented by expression (92).

$$|\omega 0 \cdot \exp(j \cdot \pi/2) \cdot \{b2+b3 \cdot \exp(j \cdot \Delta\theta 3)\}| >> |\gamma \cdot V \cdot \exp(j \cdot \Delta\theta 01) \cdot \{b2-b3 \cdot \exp(j\Delta\theta 3)\}| \quad (93)$$

In expression (93), $|\omega 0 \cdot \exp(j \cdot p/2) \cdot \{b2+b3 \cdot \exp(j \cdot \Delta\theta3)\}|$ represents the magnitude of a complex vector $\omega 0 \cdot \exp(j \cdot p/2) \cdot \{b2+b3 \cdot \exp(j \cdot \Delta\theta3)\}$, and $|\gamma \cdot V \cdot \exp(j \cdot \Delta\theta01) \cdot \{b2 \cdot b3 \cdot \exp(j \cdot \Delta\theta3)\}|$ represents the magnitude of a complex vector $\gamma \cdot V \cdot \exp(j \cdot \Delta\theta01) \cdot \{b2-b3 \cdot \exp(j \cdot \Delta\theta3)\}$.

The following expressions represent an electromotive force EdA4 which approximates the inter-electrode electromotive force E2p0 by using the condition of expression (93).

$$EdA4 \approx E2\pi 0 \qquad (94)$$

$$EdA4 = rk \cdot \exp\{j \cdot (\theta2+\theta00)\} \cdot \omega 0 \cdot \exp(j \cdot \pi/2) \cdot \{b2+b3 \cdot \exp(j \cdot \Delta\theta3)\} \qquad (95)$$

The electromotive force EdA4 is irrelevant to the magnitude V of the flow velocity, and hence is only the component generated by $\partial A/\partial t$. The electromotive force EdA4 is used to normalize a coefficient (span) by which the magnitude V of the flow velocity of the v×B component in the inter-electrode electromotive force E20 (resultant vector Va+Vb) is multiplied. FIG. 20 is a view expressing the inter-electrode electromotive forces E20, E2p0, and EdA4 described above in the form of complex vectors. Referring to FIG. 20, reference symbol E20v×B denotes a v×B component $rk \cdot \exp\{j \cdot (\theta2+\theta00)\} \cdot \gamma \cdot V \cdot \exp(j \cdot \Delta\theta01) \cdot \{b2+b3 \cdot \exp(j \cdot \Delta\theta3)\}$ of the inter-electrode electromotive force E20; E2p0v×B, a v×B, a v×B component $rk \cdot \exp\{j \cdot (\theta2+\theta00)\} \cdot \gamma \cdot V \cdot \exp(j \cdot \Delta\theta01) \cdot \{b2-b3 \cdot \exp(j \cdot \Delta\theta3)\}$ of the inter-electrode electromotive force E2p0; and E20$\partial A/\partial t$, a $\partial A/\partial t$ component $rk \cdot \exp\{j \cdot (\theta2+\theta00)\} \cdot [\omega 1 \cdot \exp(j \cdot p/2) \cdot \{b2-b3 \cdot \exp(j \cdot \Delta\theta3)\}]$ of the inter-electrode electromotive force E20.

Letting En4 be the result obtained by normalizing the inter-electrode electromotive force E20 given by equation (48) with the inter-electrode electromotive force EdA4 given by equation (95) and multiplying the normalization result by $\omega 0$, the normalized electromotive force En4 is given by equation (96):

$$En4 = (E20/EdA4) \cdot \omega 0 \qquad (96)$$
$$= rk \cdot \exp\{j \cdot (\theta2+\theta00)\} \cdot$$
$$[\omega 0 \cdot \exp(j \cdot \pi/2) \cdot \{b2-b3 \cdot \exp(j \cdot \Delta\theta3)\} +$$
$$\gamma \cdot V \cdot \exp(j \cdot \Delta\theta01) \cdot \{b2+b3 \cdot \exp(j \cdot \Delta\theta3)\}]/$$
$$[rk \cdot \exp\{j \cdot (\theta2+\theta00)\} \cdot \omega 0 \cdot \exp(j \cdot \pi/2) \cdot$$
$$\{b2+b3 \cdot \exp(j \cdot \Delta\theta3)\}] \cdot \omega 0$$
$$= \omega 0 \cdot \{b2-b3 \cdot \exp(j \cdot \Delta\theta3)\}/$$
$$\{b2+b3 \cdot \exp(j \cdot \Delta\theta3)\} +$$
$$[\gamma \cdot \exp\{(j \cdot (-\pi/2+\Delta\theta01)\}] \cdot V$$

The second term of the right side of equation (96) is the term obtained by normalizing the component generated by v×B with the component generated by $\partial A/\partial t$. FIG. 21 is a view expressing the manner of the above normalization processing in the form of complex vectors. Referring to FIG. 21, reference symbol E20v×B denotes a v×B component of the inter-electrode electromotive force E20; and n(v×B), a normalized v×B component $[\gamma \cdot \exp\{j \cdot (-p/2+\Delta\theta01)\}] \cdot V$. The reason why the result obtained by normalizing the inter-electrode electromotive force E20 with the inter-electrode electromotive force EdA4 is multiplied by $\omega 0$ is to erase the exciting angular frequency $\omega 0$ from the second term of the right side associated with the magnitude V of the flow velocity. According to equation (96), the complex coefficient by which the magnitude V of the flow velocity is multiplied has the magnitude of $\gamma$ and the angle of $-p/2+\Delta\theta01$ with respect to the real axis. The coefficient $\gamma$ and the angle $\Delta\theta01$ are constants which can be obtained in advance by calibration and the like, and the second term of the right side of equation (96) remains constant unless the flow velocity of the fluid to be measured changes.

Normalizing the v×B component by using the $\partial A/\partial t$ component, therefore, makes it possible to implement span correction of automatically correcting an error due to a magnetic field shift or phase change. Assume that the distance dl from the plane PLN including the electrodes 2a and 2b to the first exciting coil 3a is almost equal to the distance d2 from the plane PLN to the second exciting coil 3b. In this case, if b2≈b3 and $\Delta\theta3 \approx 0$, the magnitude V of the flow velocity is expressed as follows according to equation (96):

$$V = |En4/[\gamma \cdot \exp\{j \cdot (-\pi/2+\Delta\theta01)\}]| \qquad (97)$$
$$|En4|/\gamma$$

Table 4 shows the correspondence relationship between the constants and variables used in the basic principle described above and the constants and variables in this embodiment. As is obvious from Table 4, this embodiment is an example of specifically implementing the basic principle described above.

TABLE 4

Correspondence Relationship between Basic Principle and Fourth Embodiment

| Constants and Variables in Basic Principle | Constants and Variables in Fourth Embodiment |
|---|---|
| r$\omega$ | 1 |
| rv | $\gamma$ |
| $\theta\omega$ | $\pi/2$ |
| $\theta$v | $\Delta\theta01$ |
| C | $rk \cdot \exp\{j(\theta2+\theta00)\} \cdot \{b2+b3 \cdot \exp(j \cdot \Delta\theta3)\}$ |

A specific arrangement of the electromagnetic flowmeter of this embodiment and its operation will be described next. The electromagnetic flowmeter of this embodiment has the same arrangement as that of the second embodiment, and hence will be described by using reference numerals in FIG. 11.

A power supply unit 4a repeats, in a T-sec cycle, the operation of continuing the first excitation state for T0 sec in which the first exciting current with an angular frequency $\omega 0$ is supplied to the exciting coil 3a and at the same time the second exciting current with the angular frequency $\omega 0$ is supplied to the second exciting coil 3b, with a phase difference $\Delta\theta3$ from the first exciting current being almost zero, and continuing the second excitation state for T1 sec in which the phase difference between the first and second exciting currents in the first excitation state has been changed to almost p. That is, T=T0+T1.

Figure 22:
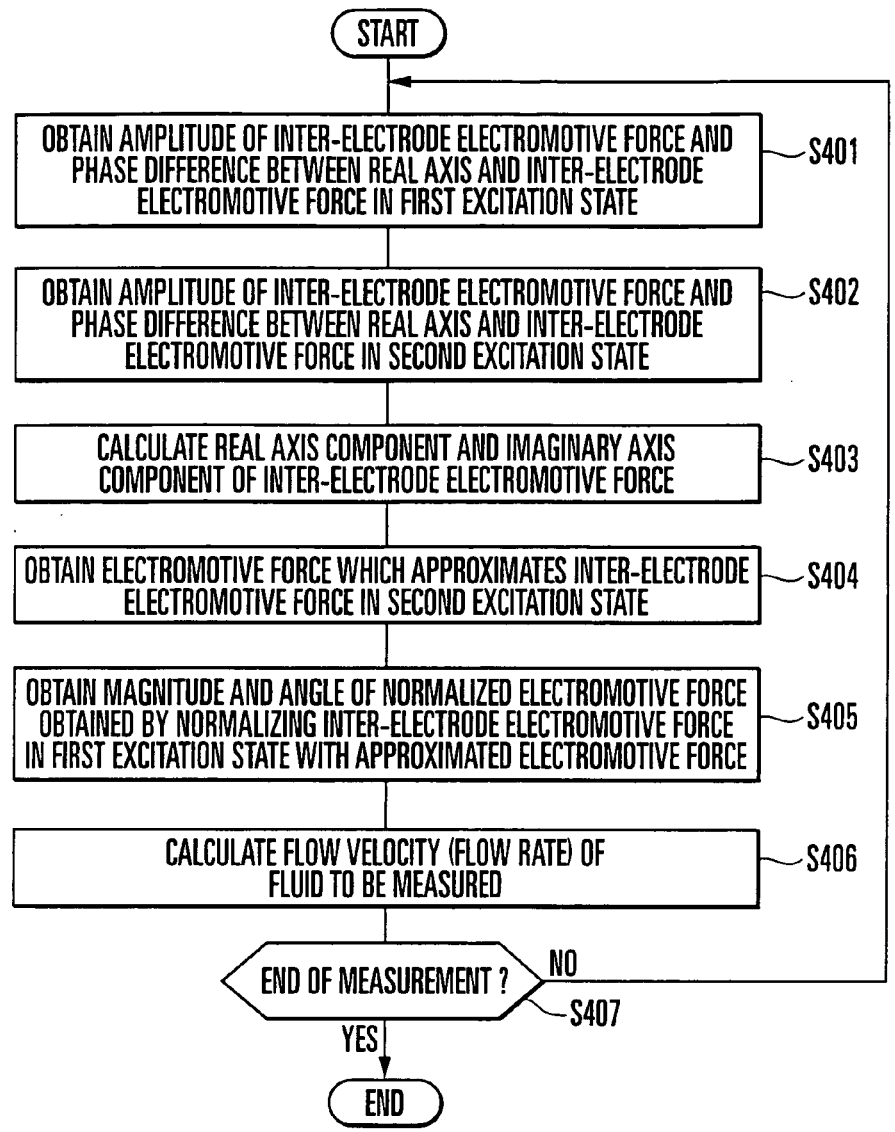
FIG. 22 is a flowchart showing the operations of a signal conversion unit and flow rate output unit in the fourth embodiment of the present invention.
Figure 23:
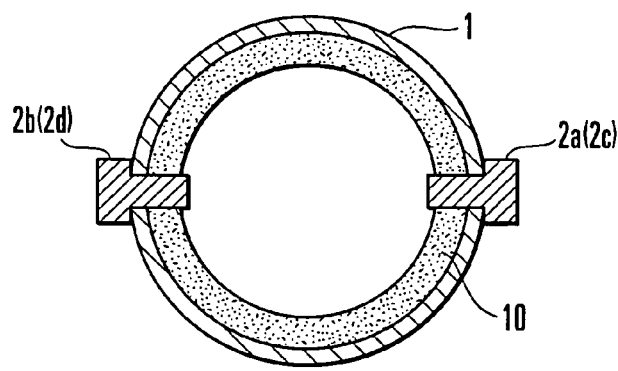
FIG. 23 is a sectional view showing an example of electrodes used in an electromagnetic flowmeter according to the present invention.

FIG. 22 is a flowchart showing the operations of a signal conversion unit 5a and flow rate output unit 6a according to this embodiment. First of all, the signal conversion unit 5a obtains an amplitude r20 of the electromotive force E20 between the electrodes 2a and 2b in the first excitation state wherein the first exciting current with the angular frequency $\omega 0$ is supplied to the first exciting coil 3a, and the second exciting current with the angular frequency ω0 is supplied to the second exciting coil 3b, with the phase difference Δθ3 with respect to the first exciting current being almost zero, and obtains a phase difference φ20 between the real axis and the inter-electrode electromotive force E20 by using a phase detector (not shown) (step S401 in FIG. 22).

Subsequently, the signal conversion unit 5a obtains an amplitude r2p0 of the electromotive force E2p0 between the electrodes 2a and 2b in the second excitation state wherein the phase difference between the first and second exciting currents in the first excitation state has been changed to almost p, and obtains a phase difference φ2p0 between the real axis and the inter-electrode electromotive force E2p0 by using the phase detector (step S402).

The signal conversion unit 5a then calculates a real axis component E20x and imaginary axis component E20y of the inter-electrode electromotive force E20, and a real axis component E2p0x and imaginary axis component E2p0y of the inter-electrode electromotive force E2p0 according to the following equations (step S403):

$$E20x = r20 \cdot \cos(\phi 20) \quad (98)$$

$$E20y = r20 \cdot \sin(\phi 20) \quad (99)$$

$$E2\pi 0x = r2\pi 0 \cdot \cos(\phi 2\pi 0) \quad (100)$$

$$E2\pi 0y = r2\pi 0 \cdot \sin(\phi 2\pi 0) \quad (101)$$

After the calculation of equations (98) to (101), the signal conversion unit 5a obtains the magnitude and angle of the electromotive force EdA4 which approximates the inter-electrode electromotive force E2p0 (step S404). The processing in step S404 corresponds to the processing of obtaining a ∂A/∂t component and a v×B component, and is equivalent to the calculation of equation (95). The signal conversion unit 5a calculates a magnitude |EdA4| of the electromotive force EdA4 which approximates the inter-electrode electromotive force E2p0 according to the following equation:

$$|EdA4| = (E2\pi 0x^2 + E2\pi 0y^2)^{1/2} \quad (102)$$

The signal conversion unit 5a then calculates an angle ∠EdA4 of the inter-electrode electromotive force EdA4 with respect to the real axis according to the following equation:

$$\angle EdA4 = \tan^{-1}(E2\pi 0y / E2\pi 0x) \quad (103)$$

With the above operation, the processing in step S404 is complete.

The flow rate output unit 6a then obtains the magnitude and angle of the normalized electromotive force |En4| obtained by normalizing the inter-electrode electromotive force E20 with the inter-electrode electromotive force EdA4 (step S405). The processing in step S405 is equivalent to the calculation of equation (96). The flow rate output unit 6a calculates a magnitude |En4| of the normalized electromotive force En4 according to the following equation:

$$|En4| = (r20 / |EdA4|) \cdot \omega 0 \quad (104)$$

The flow rate output unit 6a also calculates an angle ∠En4 of the normalized electromotive force En4 with respect to the real axis according to the following equation:

$$\angle En4 = \phi 20 - \angle EdA4 \quad (105)$$

With this operation, the processing in step S406 is complete. Note that ∠En4 is not directly used in the next step of obtaining a flow velocity (flow rate). However, this angle is used to perform measurement with higher accuracy by comparing the angle with an angle obtained at the time of calibration and is not directly associated with the essential operation of span correction, and hence a description thereof will be omitted.

The flow rate output unit 6a then calculates the magnitude V of the flow velocity of the fluid to be measured according to equation (97) (step S406).

The signal conversion unit 5a and the flow rate output unit 6a perform the processing in steps S401 to S406 described above in a cycle T until, for example, the end of the measurement is designated by the operator (YES in step S407). Note that the processing in steps S402 to S406 is performed in the second excitation state for a duration of T1 sec.

As described above, this embodiment pays attention to the fact that the inter-electrode electromotive force E2p0 can be approximately extracted as a ∂A/∂t component in the second excitation state wherein the phase difference between the magnetic field B2 generated from the first exciting coil 3a and the magnetic field B3 generated from the second exciting coil 3b is the predetermined value Δθ3+p (Δθ3 is almost zero), and the amplitudes and exciting frequencies of the magnetic fields B2 and B3 are equal to each other, and normalizes a span by which the magnitude V of the flow velocity of the v×B component in the inter-electrode electromotive force E20 (resultant vector Va+Vb) in the first excitation state is multiplied by using the ∂A/∂t component, thereby erasing the span variation element. Therefore, the embodiment can automatically perform accurate span correction and can execute accurate flow rate measurement. In addition, in this embodiment, since a ∂A/∂t component can be extracted from the inter-electrode electromotive force E2p0 in the second excitation state alone, there is no need to switch exciting frequencies as in the first to third embodiments.

In the first to fourth embodiments, since noise in in-phase components can be removed, there is no need to use the rectangular waveform excitation scheme, and the sine wave excitation scheme using a sine wave for an exciting current can be used. This makes it possible to perform high-frequency excitation. Using high-frequency excitation makes it possible to remove 1/f noise and improve responsiveness with respect to a change in flow rate.

Figure 24:
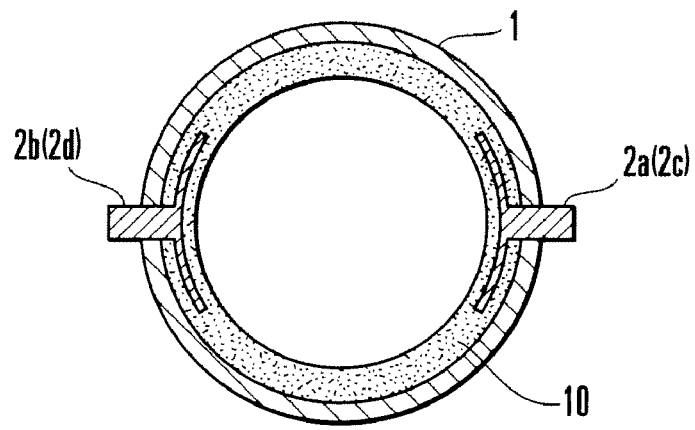
FIG. 24 is a sectional view showing another example of electrodes used in the electromagnetic flowmeter according to the present invention.

As the electrodes 2a, 2b, 2c, and 2d used in the first to fourth embodiments, electrodes which are shaped to be exposed from the inner wall of the measuring tube 1 and come into contact with a fluid to be measured, or capacitive coupling type electrodes which do not come into contact with a fluid to be measured as shown in FIG. 24 may be used. When the electrodes 2a, 2b, 2c, and 2d are of a capacitive coupling type, they are coated with a lining 10 made of ceramic, Teflon (registered trademark), or the like formed on the inner wall of the measuring tube 1.

The first to fourth embodiments use one pair of electrodes 2a and 2b as the first electrodes, and one pair of electrodes 2c and 2d as the second electrodes. However, the present invention is not limited to this. These embodiments may use one each of the first and second electrodes. If only one electrode is to be used, a ground ring or ground electrode for grounding the potential of a fluid to be measured is provided on the measuring tube 1, and the electromotive force (the potential difference from the ground potential) generated on the one electrode may be detected by the signal conversion units 5, 5a, and 5b. When one pair of electrodes are to be used, an electrode axis is a straight line connecting the pair of electrodes. When only one electrode is to be used, an electrode axis is a straight line connecting the real electrode to a virtual electrode, assuming that the virtual electrode is placed at a position to face the real electrode through the measuring tube axis PAX on the plane PLN including the one real electrode.

Furthermore, in the first to fourth embodiments, of the signal conversion units 5, 5a, 5b and the flow rate output units 6, 6a, and 6b, components except for those used for the detection of electromotive forces can be implemented by a computer including a CPU, storage device, and interface, and programs which control these hardware resources.

INDUSTRIAL APPLICATION

The present invention can be applied to flow rate measurement of a fluid to be measured which flows in a measuring tube.

The invention claimed is:

1. An electromagnetic flowmeter comprising:
a measuring tube through which a fluid to be measured flows;
an electrode which is placed in said measuring tube and detects an electromotive force generated by a magnetic field applied to the fluid and a flow of the fluid;
an exciting unit which applies, to the fluid, a time-changing magnetic field asymmetrical to a first plane which includes said electrode and is perpendicular to an axial direction of said measuring tube;
a signal conversion unit which extracts a ∂A/∂t component irrelevant to a flow velocity of the fluid from a resultant electromotive force of an electromotive force based on the ∂A/∂t component and an electromotive force based on a v×B component originating from the flow velocity of the fluid; and
a flow rate output unit which removes a variable factor for a span as a coefficient by which a magnitude V of a flow velocity of the v×B component in the resultant electromotive force is multiplied, on the basis of the extracted ∂A/∂t component, and calculates a flow rate of the fluid from a result obtained by removing the variation factor,
wherein said exciting unit applies the magnetic fields to the fluid while switching exciting frequencies,
said signal conversion unit obtains an amplitude and phase of the resultant electromotive force in each of at least two excitation states in which the exiting frequencies differ from each other, and extracts the ∂A/∂t component on the basis of the amplitude and phase of the resultant electromotive force, and
said flow rate output unit removes a variation factor for a span contained in a v×B component in a resultant electromotive force at a given exciting frequency on the basis of the extracted ∂A/∂t component, and calculates a flow rate of the fluid from a result obtained by removing the variation factor.

2. An electromagnetic flowmeter according to claim 1, characterized in that
said exciting unit comprises an exciting coil placed at a position spaced apart by an offset from the first plane which includes said electrode and is perpendicular to the axial direction of said measuring tube, and a power supply unit which supplies an exciting current to the exciting coil while switching exciting frequencies,
said signal conversion unit obtains an amplitude and phase of the resultant electromotive force in each of a first excitation state and a second excitation state in which the exciting frequencies differ from each other, and extracts an electromotive force difference between a resultant electromotive force in the first excitation state and a resultant electromotive force in the second excitation state as the ∂A/∂t component on the basis of the amplitudes and phases of the resultant electromotive forces, and
said flow rate output unit removes a span variation factor contained in a v×B component in a resultant electromotive force in the first excitation state on the basis of the extracted ∂A/∂t component, and calculates a flow rate of the fluid from a result obtained by removing the variation factor.

3. An electromagnetic flowmeter according to claim 1, characterized in that
said exciting unit comprises a first exciting coil placed at a position spaced apart by a first offset from the first plane which includes said electrode and is perpendicular to the axial direction of said measuring tube, a second exciting coil which is placed at a position spaced apart by a second offset from the first plane so as to face the first exciting coil through the first plane, and a power supply unit which supplies exciting currents to the first exciting coil and the second exciting coil which switching a phase difference between the exciting current supplied to the first exciting coil and the exciting current supplied to the second exciting coil and exciting frequencies of the exciting currents,
said signal conversion unit which obtains amplitudes and phases of the resultant electromotive forces in three excitation states including a first excitation state in which a phase difference between a first magnetic field generated by the first exciting coil and a second magnetic field generated by the second exciting coil is Δθ3, and an exciting angular frequency is ω0, a second excitation state in which the phase difference between the first magnetic field and the second magnetic field in the first excitation state has changed from Δθ3 to Δθ3+π, and a third excitation state in which the exciting angular frequency in the second excitation state has changed to ω1, and extracts an electromotive force difference between the resultant electromotive force in the second excitation state and the resultant electromotive force in the third excitation state as the ∂A/∂t component on the basis of the amplitudes and the phases, and
said flow rate output unit removes a variation factor for a span contained in a v×B component in a resultant electromotive force in the first excitation state on the basis of the ∂A/∂t component, and calculates a flow rate of the fluid from a result obtained by removing the variation factor.

4. An electromagnetic flowmeter according to claim 1, characterized in that
said exciting unit comprises an exciting coil which applies a magnetic field to the fluid and a power supply unit which supplies an exciting current to the exciting coil while switching exciting frequencies,
said electrode comprises a first electrode placed at a position spaced apart by a first offset from a second plane which include an axis of the exciting coil and is perpendicular to an axial direction of said measuring tube, and a second electrode which is placed at a position spaced apart by a second offset from the second plane so as to face the first electrode through the second plane,
said signal conversion unit obtains amplitudes and phases of electromotive force differences between first resultant electromotive forces detected by the first electrode and second resultant electromotive forces detected by the second electrode in a first excitation state and a second excitation state in which the exciting frequencies differ from each other, and extracts a difference between the electromotive force differences in the first excitation state and the second excitation state as the ∂A/∂t component on the basis of the amplitudes and phases of the electromotive force differences, and said flow rate output unit removes a variation factor for a span contained in a v×B component in an electromotive force sum of the first resultant electromotive force and the second resultant electromotive force in the first excitation state.

5. An electromagnetic flowmeter according to claim 1, characterized in that said exciting unit comprises an exciting coil which applies a magnetic field to the fluid and a power supply unit which supplies an exciting current to the exciting coil while switching exciting frequencies, said electrode comprises a first electrode placed at a position spaced apart by a first offset from a second plane which include an axis of the exciting coil and is perpendicular to an axial direction of said measuring tube, and a second electrode which is placed at a position spaced apart by a second offset from the second plane so as to face the first electrode through the second plane, said signal conversion unit obtains amplitudes and phases of electromotive force sums of first resultant electromotive forces detected by the first electrode and second resultant electromotive forces detected by the second electrode in a first excitation state and a second excitation state in which the exciting frequencies differ from each other, and extracts a difference between the electromotive force sums in the first excitation state and the second excitation state as the $\partial A/\partial t$ component on the basis of the amplitudes and phases of the electromotive force sums, and said flow rate output unit removes a variation factor for a span contained in a v×B component in an electromotive force difference between the first resultant electromotive force and the second resultant electromotive force in the first excitation state on the basis the extracted $\partial A/\partial t$ component, and calculates a flow rate of the fluid from a result obtained by removing the variation factor.

6. An electromagnetic flowmeter comprising:

a measuring tube through which a fluid to be measured flows;

an electrode which is placed in said measuring tube and detects an electromotive force generated by a magnetic field applied to the fluid and a flow of the fluid;

an exciting unit which applies, to the fluid, a time-changing magnetic field asymmetrical to a first plane which includes said electrode and is perpendicular to an axial direction of said measuring tube;

a signal conversion unit which extracts a $\partial A/\partial t$ component irrelevant to a flow velocity of the fluid from a resultant electromotive force of an electromotive force based on the $\partial A/\partial t$ component and an electromotive force based on a v×B component originating from the flow velocity of the fluid; and a flow rate output unit which removes a variable factor for a span as a coefficient by which a magnitude V of a flow velocity of the v×B component in the resultant electromotive force is multiplied, on the basis of the extracted $\partial A/\partial t$ component, and calculates a flow rate of the fluid from a result obtained by removing the variation factor, wherein said exciting unit generates magnetic fields with the same exciting frequency from a plurality of exciting coils and applies the magnetic fields to the fluid while switching a phase difference between the magnetic fields generated from the respective exciting coils, said signal conversion unit obtains an amplitude and phase of the resultant electromotive force in each of at least two excitation states in which the phase differences differ from each other, and extracts a resultant electromotive force in a specific excitation state in which the phase difference is a predetermined value as the $\partial A/\partial t$ component on the basis of the amplitude and phase of the resultant electromotive force, and said flow rate output unit removes a variation factor for a span contained in a v×B component in a resultant electromotive force in another excitation state which differs from the specific excitation state on the basis of the extracted $\partial A/\partial t$ component.

7. An electromagnetic flowmeter according to claim 6, characterized in that said exciting unit comprises a first exciting coil placed at a position spaced apart by a first offset from the first plane which includes said electrode and is perpendicular to the axial direction of said measuring tube, a second exciting coil which is placed at a position spaced apart by a second offset from the first plane so as to face the first exciting coil through the first plane, and a power supply unit which supplies exciting currents with the same frequency to the first exciting coil and the second exciting coil while switching a phase difference between the exciting current supplied to the first exciting coil and the exciting current supplied to the second exciting coil, said signal conversion unit which obtains amplitudes and phases of the resultant electromotive forces in two excitation states including a first excitation state in which a phase difference between a first magnetic field generated by the first exciting coil and a second magnetic field generated by the second exciting coil is substantially zero, and a second excitation state in which the phase difference between the first magnetic field and the second magnetic field in the first excitation state is substantially $\pi$, and extracts a resultant electromotive force in the second excitation state as the $\partial A/\partial t$ component on the basis of the amplitude and phase of the resultant electromotive force, and said flow rate output unit which removes a variation factor for a span contained in a v×B component in a resultant electromotive force in the first excitation state on the basis of the extracted $\partial A/\partial t$ component, and calculates a flow rate of the fluid from a result obtained by removing the variation factor.

* * * * *